United States Patent
Adamik

[15] 3,652,193
[45] Mar. 28, 1972

[54] SLUSH MOLDING MACHINE

[72] Inventor: Jaroslav F. Adamik, 412 Barden Ln., Warren, R.I. 02885

[22] Filed: Nov. 6, 1969

[21] Appl. No.: 871,591

Related U.S. Application Data

[63] Continuation of Ser. No. 625,678, Mar. 24, 1967, abandoned.

[52] U.S. Cl. .............................425/214, 18/20 R, 425/261, 425/429, 425/432, 425/434, 425/439, 425/447
[51] Int. Cl. ...........................................................B29c 5/00
[58] Field of Search ...............18/20 C, 20 P, 6 M, 2 K, 26 M, 18/26 R, 24; 25/29

[56] References Cited

UNITED STATES PATENTS

| | | | |
|---|---|---|---|
| 2,041,788 | 5/1936 | Sprunger | 18/24 |
| 2,880,468 | 4/1959 | Mooney et al. | 18/26 X |
| 3,403,639 | 10/1968 | Hirahara et al. | 18/24 UX |

FOREIGN PATENTS OR APPLICATIONS

| | | | |
|---|---|---|---|
| 348,812 | 10/1960 | Switzerland | 18/26 M |

*Primary Examiner*—Spencer J. Overholser
*Assistant Examiner*—Michael O. Sutton
*Attorney*—Roberts, Cushman & Grover

[57] ABSTRACT

Slush-molding apparatus embodying a support for repeatedly intermittently moving a plurality of hollow molds from one station to another along a predetermined path and apparatus at these stations for successively filling the hollow molds with liquid plastic, applying heat to form a gelled layer internally of each mold, discharging the excess liquid plastic, partially curing the residual layer in each mold, and, finally, curing the residual layer. Additionally, there is apparatus for increasing the thickness of the gelled layer in certain areas and for adding plastic to certain areas of the partially cured layer.

27 Claims, 27 Drawing Figures

FIG. IA

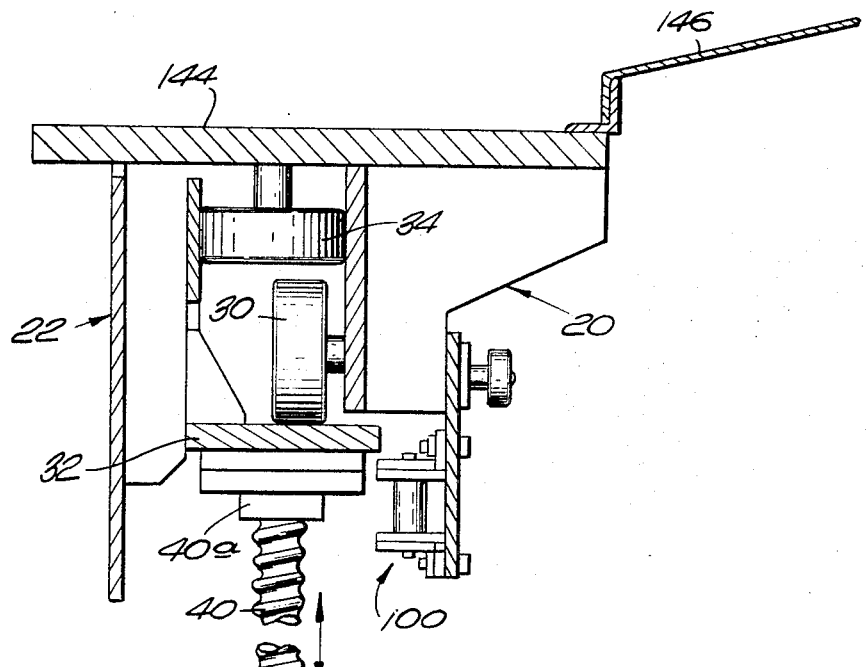
FIG. 4
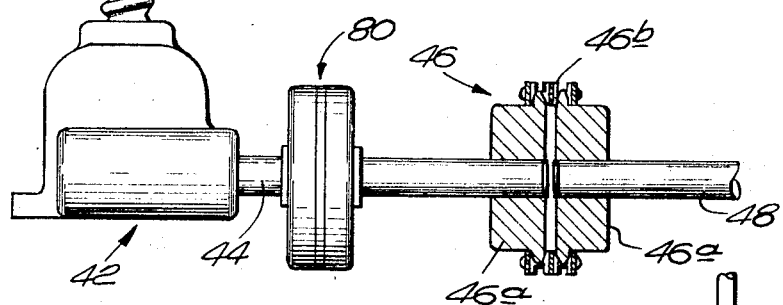
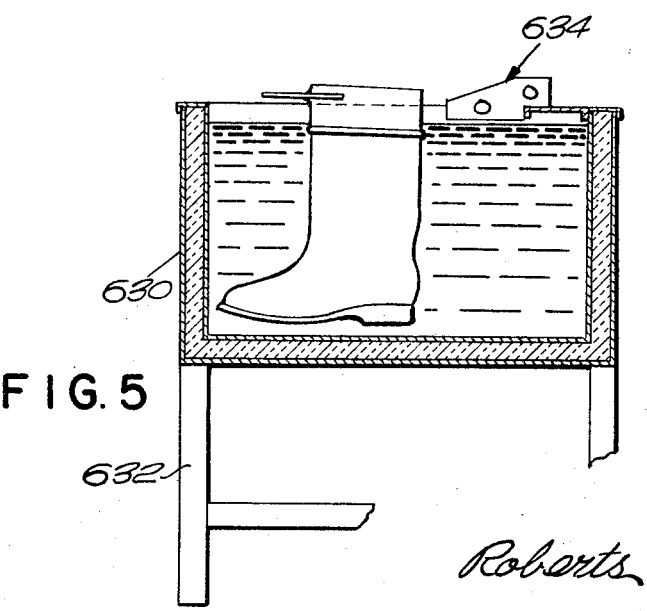
FIG. 5
FIG. 6
INVENTOR.
JAROSLAV F. ADAMIK

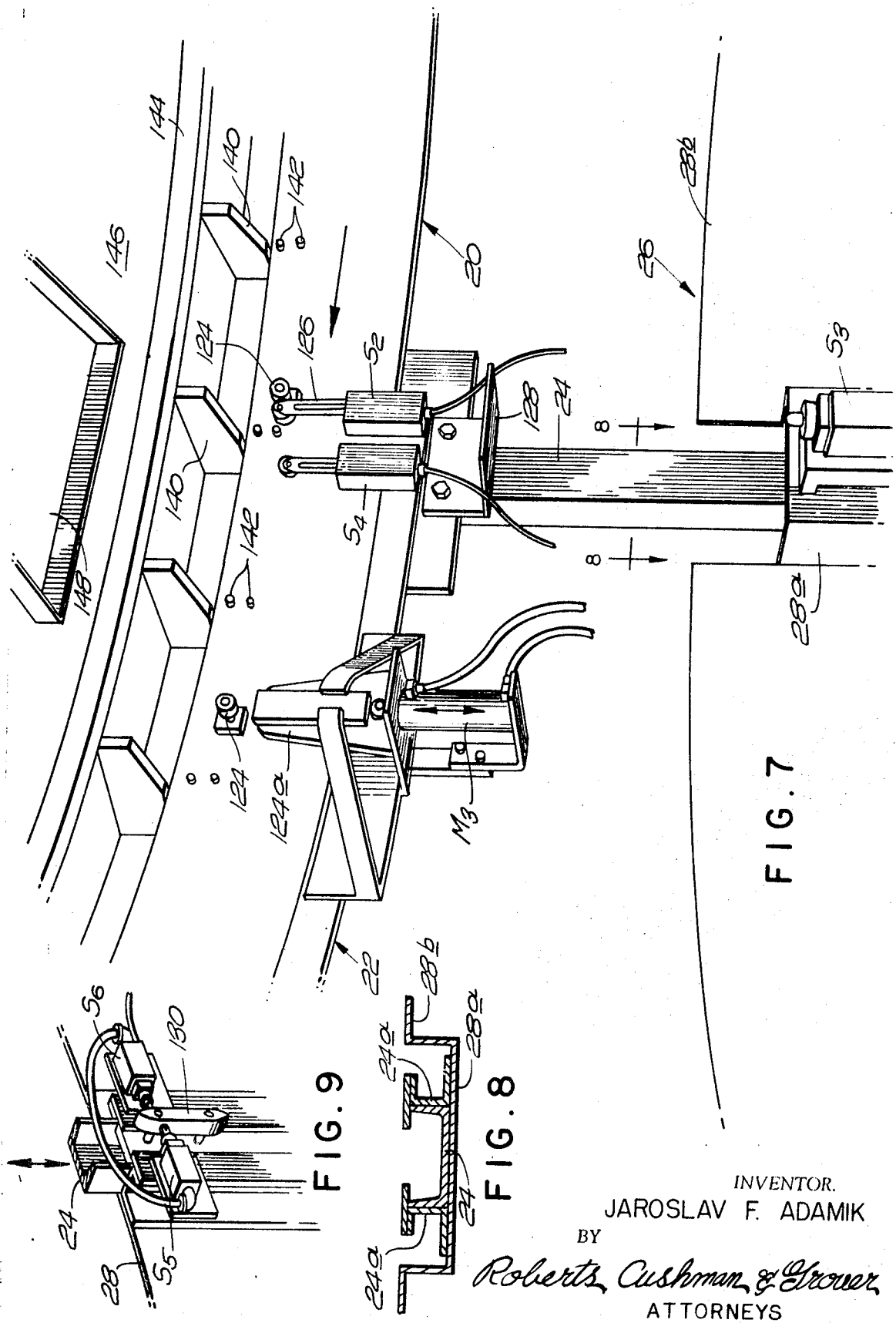

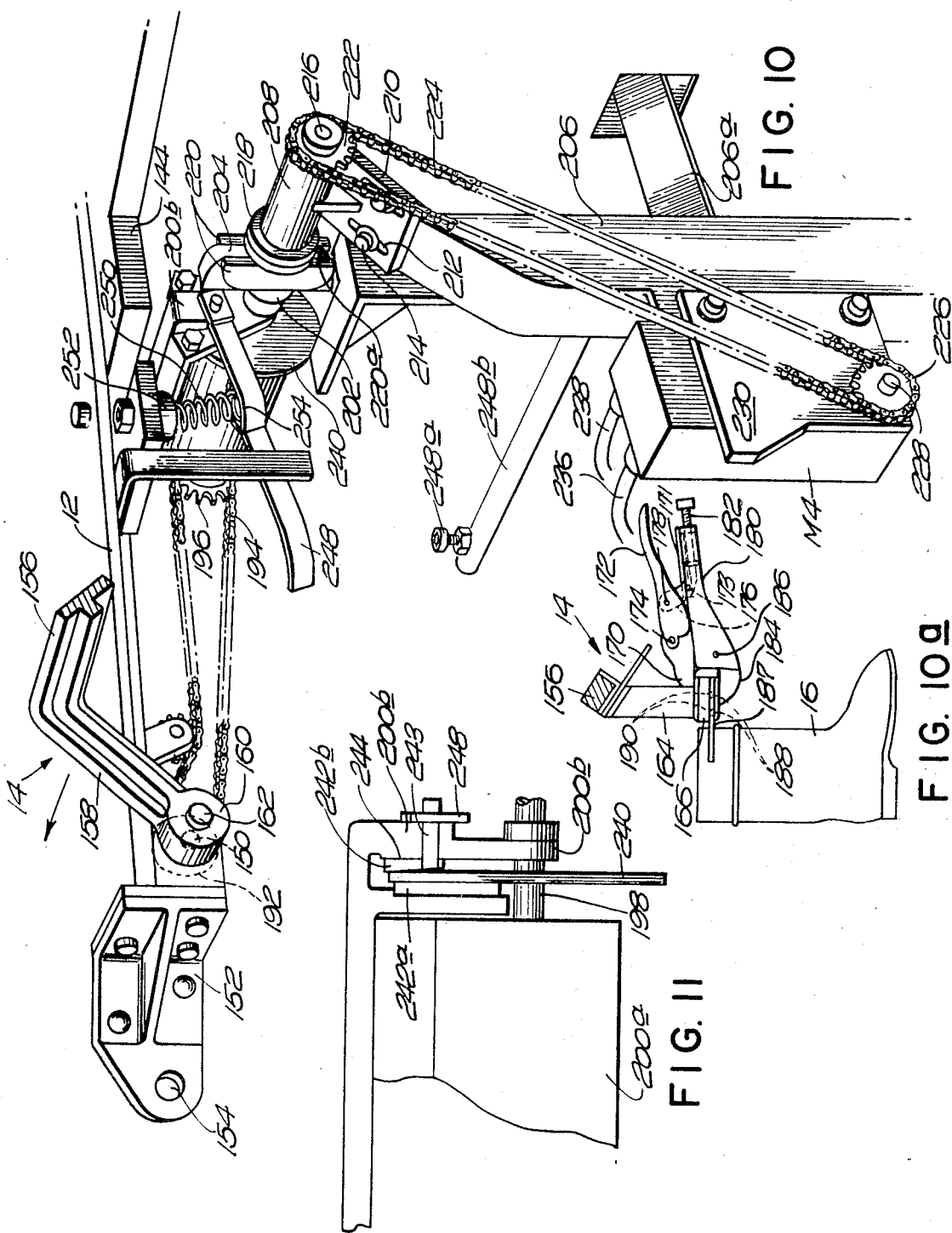

INVENTOR.
JAROSLAV F. ADAMIK
BY
Roberts Cushman & Grover
ATTORNEYS

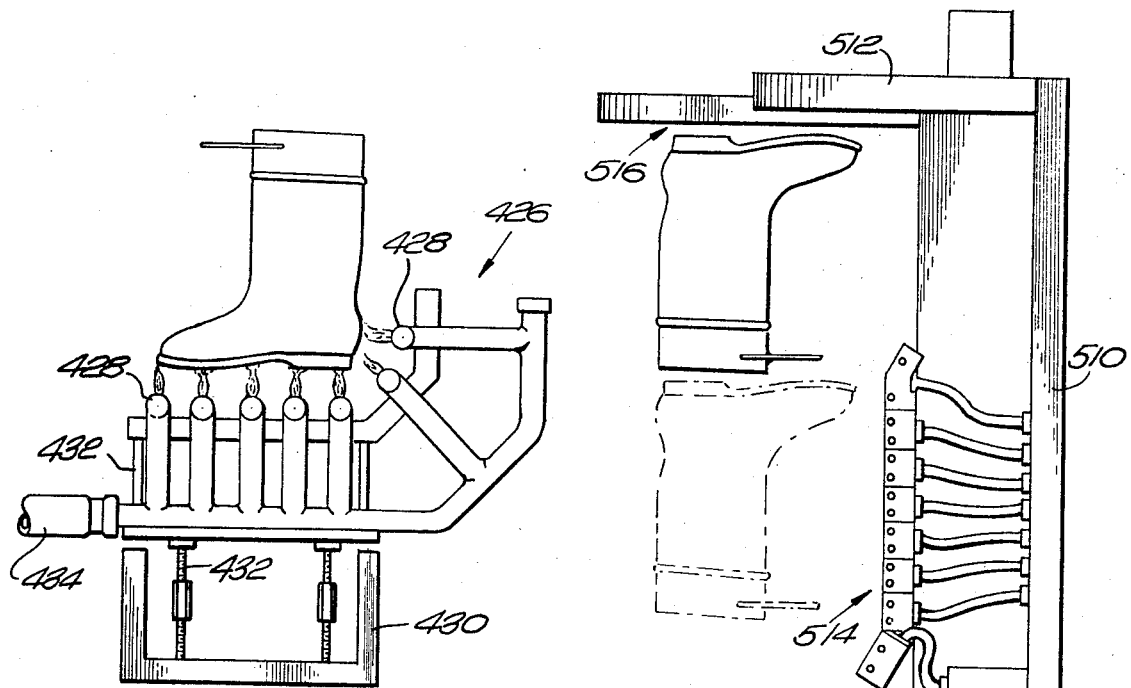
FIG. 18
FIG. 19
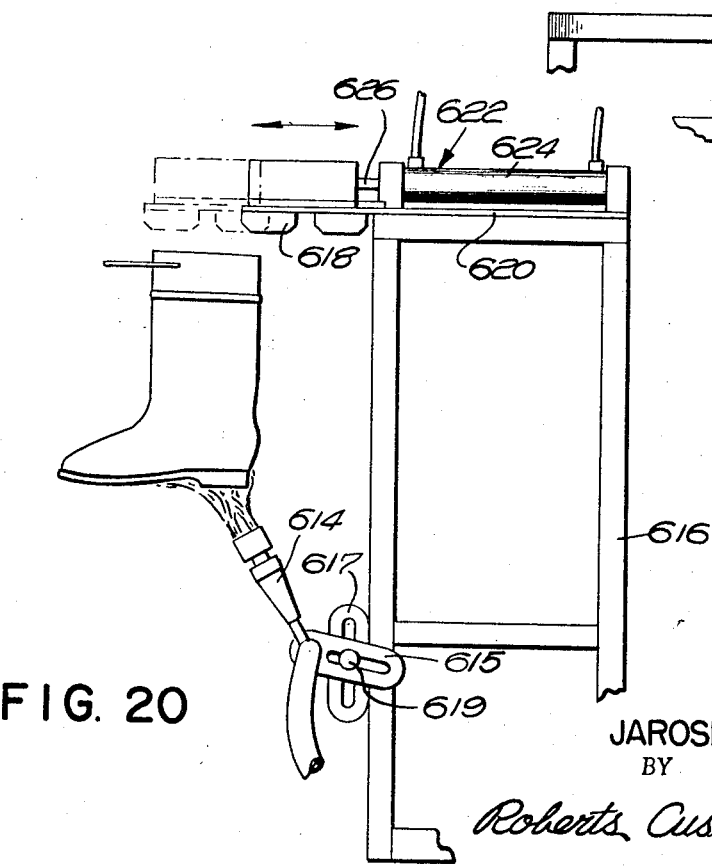
FIG. 20

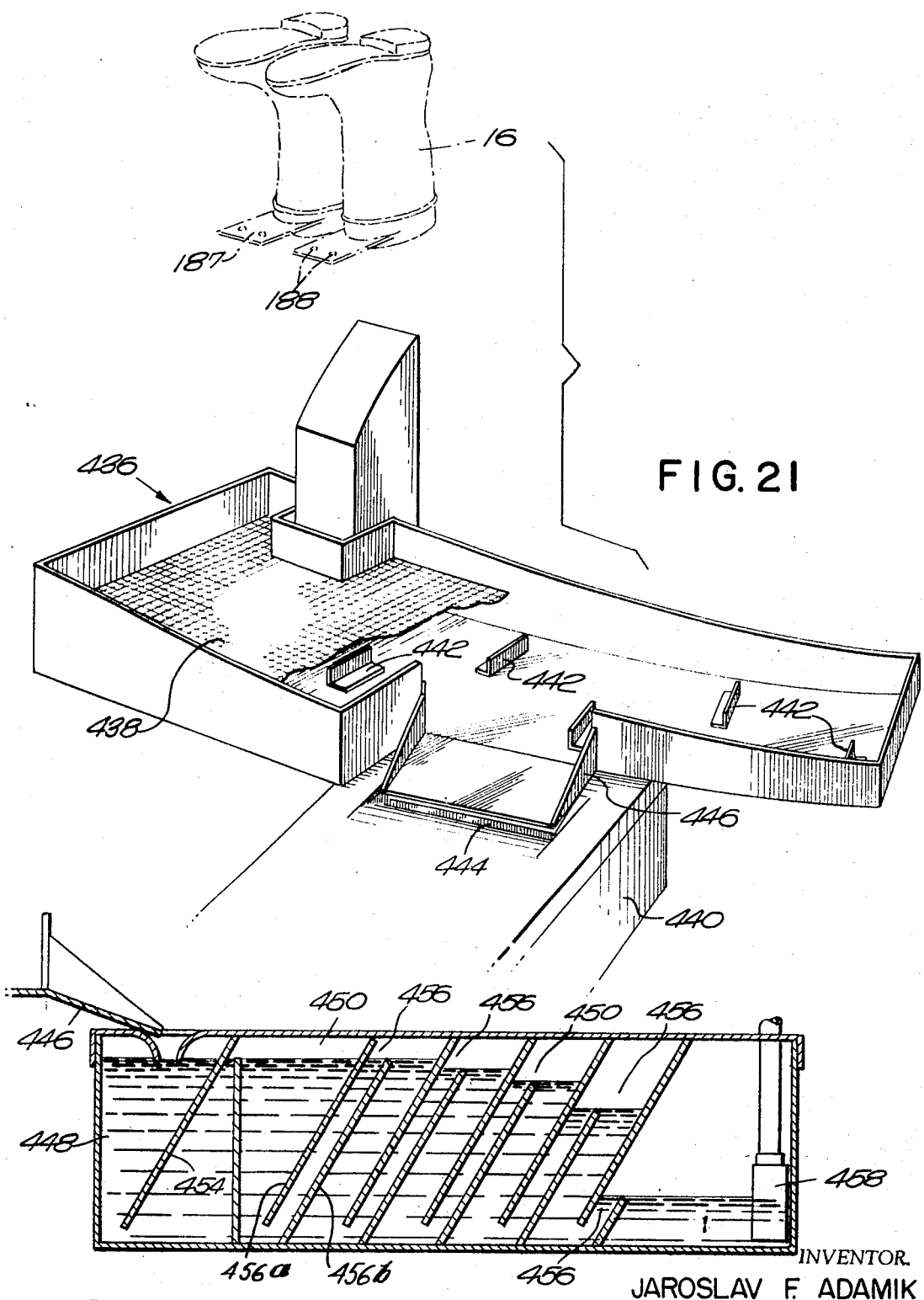

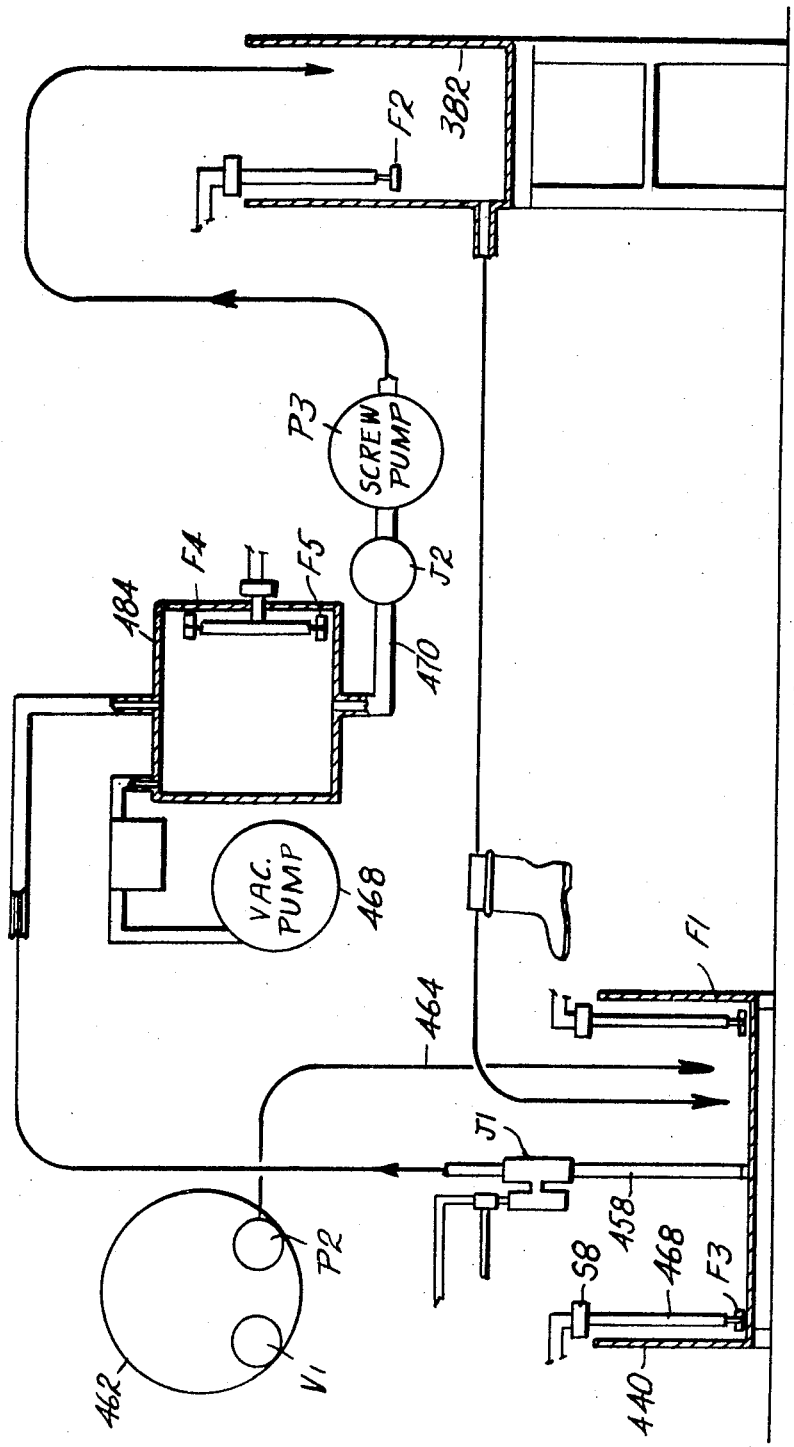
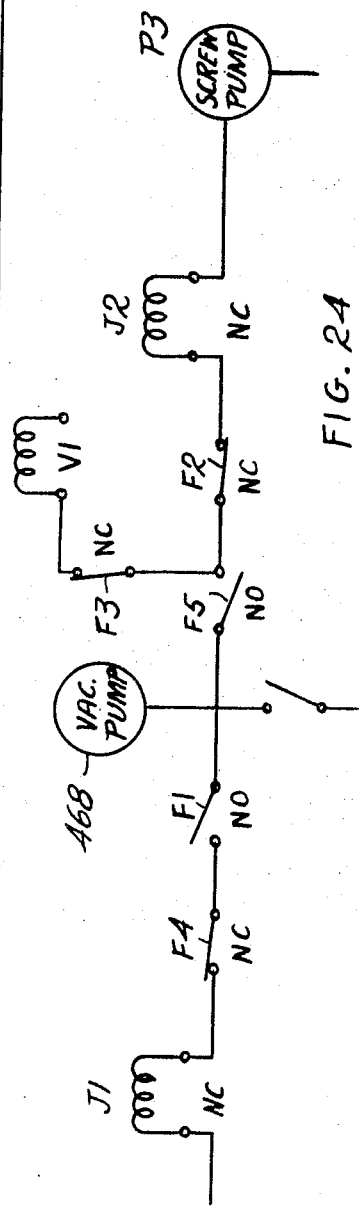
FIG. 23
FIG. 24

INVENTOR.
JAROSLAV F. ADAMIK 3,652,193

SLUSH MOLDING MACHINE

This application is a streamlined continuation of my abandoned application Ser. No. 625,678, filed Mar. 24, 1967.

BACKGROUND OF THE INVENTION

Heretofore such molding of articles of footwear has been for the most part carried out by placing hollow molds on a conveyor whereby they are moved successively along a predetermined path. Along this path there are operators who fill the molds with liquid plastic, dump the excess plastic from the molds as soon as a layer of suitable thickness has been formed, add liquid plastic when desirable to certain areas to effect reinforcement thereof, and strip the finished articles from the molds when finally cured. Between these operations the molds are subjected to heating to effect initial gelling of a layer of suitable thickness interiorly of each mold, partial curing of the gelled layer and final curing of the finished article. The entire operation is hot, dirty, tedious, wasteful of plastic, slow and hazardous and except for the conveyor which moves the molds from operator to operator, the successive operations are performed by hand. Even with experienced operators it is difficult under these conditions to obtain the uniformity of end products desired.

It is the purpose of this invention to provide apparatus whereby the aforesaid method of slush-molding of hollow articles may be carried out expeditiously and relatively inexpensively and which requires a minimum amount of manual effort or supervision.

SUMMARY

As herein illustrated, the apparatus comprises a mold support movable along a predetermined path for carrying molds mounted on the support through a series of stations. The support is movable vertically from one level to another as it moves along the path and there is means for effecting repeated intermittent movement of the mold support and molds carried thereby from one station to the next while the support is at the higher level, and means for effecting movement of the mold support and molds carried thereby from the higher level to the lower level and then back to the higher level during intervals between successive intermittent movements. At each station there is means operative, while the molds are at the lower level, to perform at least one operation incident to the manufacture of the articles being molded. The stations are situated along the path of movement of the mold support and comprise means for filling the molds with a thermosetting plastisol, means for applying heat to the exteriors of the molds to form a layer of gelled plastic on the interior of each mold, means for removing the ungelled plastisol from the molds, and means for partially curing the gelled layers. At the station for filling there is means for automatically initiating discharge of liquid plastisol into the molds, means for minimizing formation of bubbles, and means for automatically terminating filling of the molds when a predetermined level is reached. At the station where the plastisol is initially gelled there is heating means for applying heat to the exterior of the molds comprising a liquid bath into which the molds are thrust at a level corresponding substantially to the level of the plastisol in the molds, and there is means for maintaining a uniform temperature throughout the bath. At the station for removing the excess ungelled plastisol there is means for inverting the molds. At the station for effecting partial curing there is means for applying heat to the bottoms and walls of the molds while the latter are still inverted. Optionally, there is additional heating means following formation of the gelled layer in the liquid bath for applying heat to specific areas to increase the thickness of the gelling layer. At the station where the excess plastisol is dumped and the station following this there is means for collecting the discharged plastisol, de-aerating it and returning it blended with fresh plastisol whenever fresh plastisol is required to replenish the plastisol consumed to the main supply tank at the filling station for reuse. Following partial curing there is means at the next station of operation for adding a predetermined quantity of plastisol and for distributing it over predetermined areas to reinforce the articles in these areas. At succeeding stations there is heating means for initiating curing of the thicker areas, means in the form of liquid baths in which the molds are successively submerged to effect complete curing, means for washing the exterior surfaces of the molds, means for preconditioning the molds for the next cycle of operation, and optionally means for applying a pressure-sensitive adhesive to the interiors of the finished articles. The support for the molds comprises a rigid structure rotatable about a predetermined axis and there is means for effecting repeated rotation comprising a power-operable motor, a drive shaft, rotation of which effects rotation of the rotor, a driving connection between the motor and the shaft which includes a clutch movable through a predetermined distance to effect rotation of the rotor the distance of one station, switch means operable as the rotor approaches the next position but prior to reaching the next position to stop the motor so that the rotor slows down to a stop, and means for deactivating the clutch when the latter has traveled the aforesaid predetermined distance. There are means on the rotatable part movable therewith to actuate a switch as the rotor slows to a stop to move a lock mounted on the non-rotatable part into engagement with a preceding one of said means on the rotatable part to stop the rotor and hold it in place until disengaged. The rotatable part and the non-rotatable part are supported for vertical movement by screws mounted on a base and there is power-operable means including ball nuts on the screws and shafts drivably connecting the power-operable means to the ball nuts so as to effect their rotation on the one hand to raise the screws and hence the rotatable and non-rotatable structures and on the other hand to lower the screws and hence to lower the rotatable and non-rotatable structures. The limit switches are provided for terminating upward and downward movement, there are electrically actuatable brakes for bringing the structures to a stop without rebound, and yieldable means embodied in the shafting for absorbing the torque imparted thereto by the power-operable means. The revolvable structure includes a plurality of arms fixed thereto in radial relation to the center of rotation and extending radially therefrom, and a bracket rotatably mounted between each pair of arms. Clamping means are mounted on each bracket for attaching molds thereto and there is means for effecting rotation of each bracket to enable rotating the molds relative to a horizontal axis comprising a drivable shaft mounted on one arm of each pair of arms, a driving connection between the drivable shaft and the bracket, a drive shaft on the base at each of several of the stations of operation, and means on the drivable shaft and drive shaft engageable by movement of the rotatable structure to the lower level to drivably connect the shafts. A brake on each drivable shaft normally prevents rotation of the bracket while the drivable shaft is disconnected from the drive shaft.

The invention will now be described with reference to the accompanying drawings wherein:

FIG. 1a is an elevation of the machine;

FIG. 4 is a fragmentary vertical elevation taken partly in section through the rotor and its support illustrating in elevation one of three screws for effecting elevation and lowering of the rotor;

FIG. 5 is a vertical section through a curing tank showing a mold submerged therein;

FIG. 6 is an elevation of a mold showing a spray nozzle lowered into it for spraying the interior of the finished article with a pressure-sensitive adhesive;

FIG. 7 is a fragmentary elevation taken interiorly of the base showing a portion of the base, a supporting leg, the rotor and the support for the rotor;

FIG. 8 is a horizontal section taken on the line 8—8 of FIG. 7;

FIG. 9 is a fragmentary perspective from outside the base adjacent one of the legs, showing limiting switches, one for stopping upward movement of the rotor and the other for starting rotation of the rotor;

FIG. 10 is a perspective of mechanism for rotating the brackets to which the molds are attached to enable inverting and/or moving the molds to inclined positions;

FIG. 10a is a fragmentary elevation taken through a bracket showing the relation of a mold thereto when the latter is upright;

FIG. 11 is a fragmentary elevation showing braking means for preventing rotation of the brackets except when connected to the driving means therefor;

FIG. 18 is an elevation of a gas heating device for applying heat to the exterior of the molds at the bottom and counter portions thereof prior to emptying of the excess plastisol therefrom;

FIG. 19 is an elevation of heat-radiating means for applying heat to the exteriors of the molds, after the latter have been inverted to remove the excess plastisol, to effect partial curing of the gelled layer left therein;

FIG. 20 is an elevation of a gas heating unit for applying heat to the heel ends of the molds after the partially cured layers have been reinforced in certain areas by addition of plastisol thereto;

FIG. 21 is a perspective view showing the molds inverted for dumping and a tray situated therebelow for receiving the plastisol dumped therefrom;

FIG. 22 is a section through a recovery tank for receiving the used plastisol, de-aerating it and returning it to the main supply tank;

FIG. 23 is a diagram of the plastisol recovery system;

FIG. 24 is a diagram of the electric circuit for the recovery system; and

Figure 1:
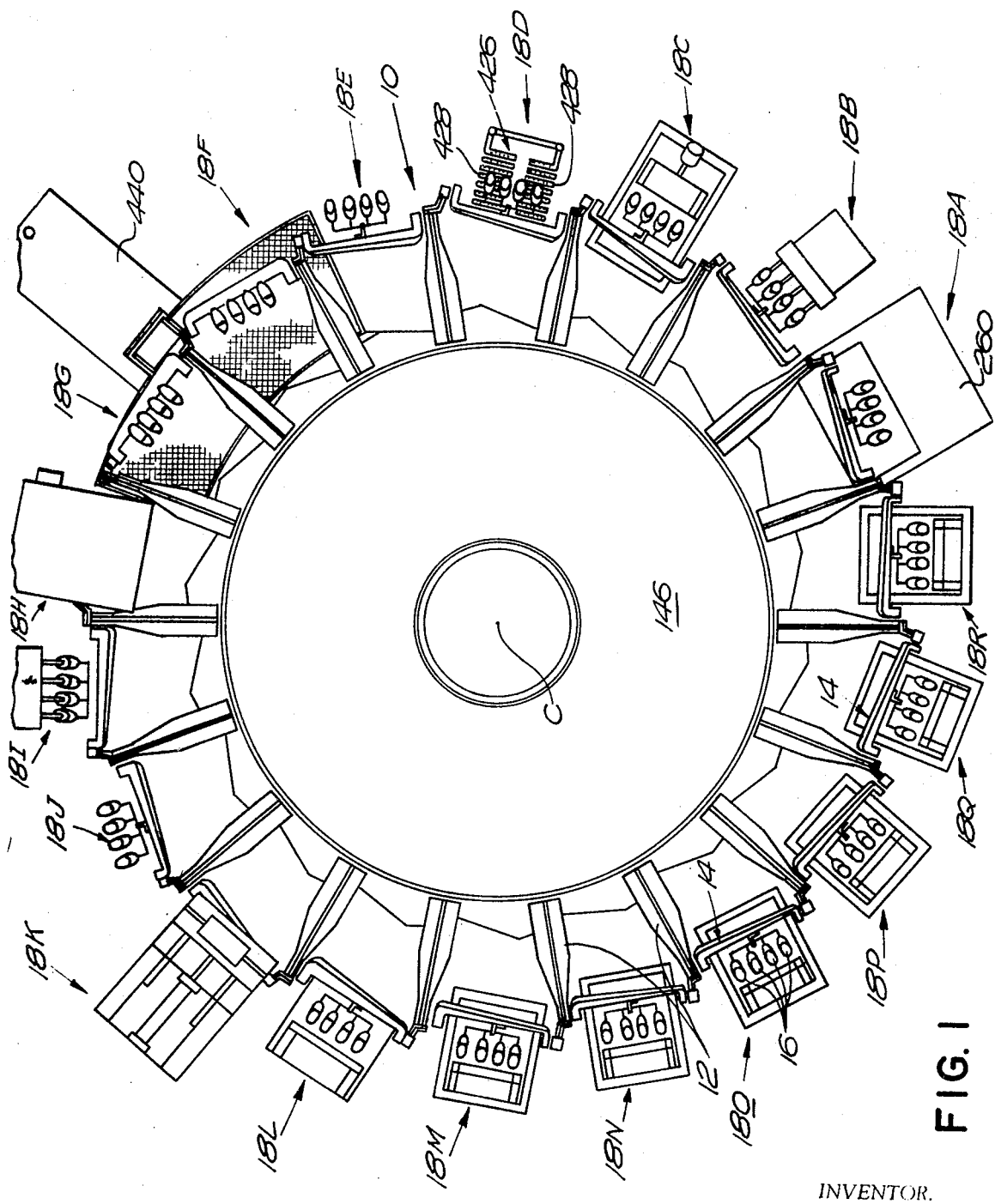
FIG. 1 is a plan view of the machine showing the several stations of operation situated circularly around it.
Figure 2:
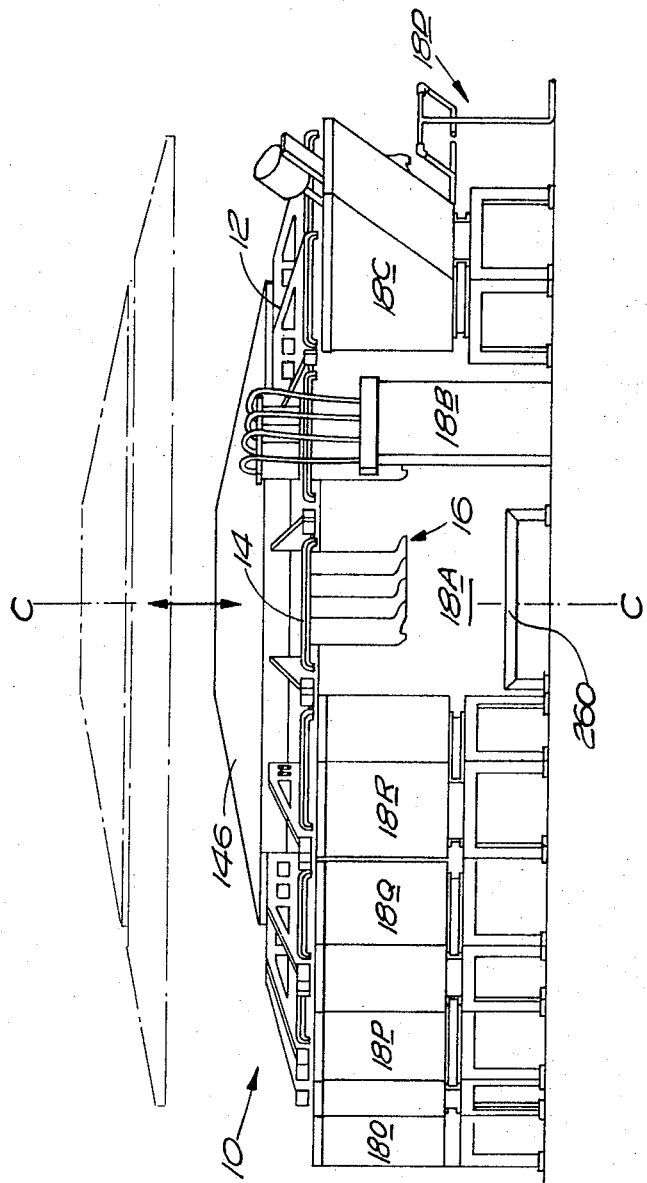
FIG. 2 is a plan view interiorly of the base of the machine showing the driving means for effecting both rotation of the rotor and elevation and lowering thereof, parts of the shafting being omitted where identical with parts shown.

Referring to the drawings (FIGS. 1 and 2), the machine comprises a rotor 10, supported for rotation about a vertical axis C, which has on it radially extending arms 12, each pair of arms supporting a bracket 14 and each bracket being adapted to support one or more hollow molds 16, so that by rotation of the rotor the molds are movable circularly about the axis C relative to a plurality of operating stations 18A to 18R inclusive, for the performance of operation incident to the formation of the articles to be manufactured to effect partial or complete fabrication of the articles. Although a turret-type rotor is employed herein to move the mold from station to station, it is within the scope of the invention to employ transmitting means of any convenient configuration.

The rotor 10 comprises a rotatable structure 20 (FIGS. 4 and 7) of annular configuration supported, as will appear hereinafter, for rotation about the axis C within a non-rotatable structure 22 also of annular configuration. The non-rotatable structure 22 is fastened to the upper ends of a plurality of legs 24 which are slidably supported between ways 24a (FIG. 8), the latter being secured to the bottom of channel members 28a forming part of a base 26 comprised of a plurality of channel members 28a and sheet metal plates 28b joining them. The channel members 28a and sheet metal plates 28b collectively form a circular housing at the base of the machine within which the driving components are contained.

The rotatable structure 20 (rotor) is supported for rotation on the non-rotatable structure 22 by a plurality of radially extending roller bearings 30 (FIG. 4) which roll on a horizontal track 32 fixed to the inner side of the non-rotatable structure 22, and is maintained in concentric relation with the non-rotatable structure 22 by a plurality of roller bearings 34 supported on the rotatable structure 20 between the rotatable and non-rotatable structures so as to have rolling engagement with the outer surface of the structure 20 and the inner surface of the structure 22.

The structures 20 and 22 are movable in unison vertically relatively to the base 26 from an upper level (FIG. 1a, shown in dotted lines) wherein the rotatable structure 20 is rotatable relative to the non-rotatable structure 22 to enable moving a mold or plurality of molds from one station of operation to the next, to a lower level, as shown in FIG. 1a in full lines, wherein the rotatable structure is fixed relative to the non-rotatable structure to hold the mold or molds at the respective stations of operation for performance of an operation consistent with manufacture of the articles to be made. Elevation of the structures 20 and 22 is accomplished by a plurality of screws 40 (FIGS. 2 and 4), spaced equidistantly about the axis C. The upper ends of the screws 40 are supported in bearing plates 40a, the latter being fastened to the underside of the non-rotatable structure 22. The lower ends of the screws 40 extend through worm housings 42 and preferably the driving connection between the worm and screw is a ball nut of the non-frictional type commonly known as a "Saginaw screw drive." Rotation of the worm effects elevation and depression of the screw. A worm shaft 44 extends from each screw and is connected by a flexible coupling 46 to a shaft 48. Two of the shafts 48, those in axial alignment, are connected to a differential 54. A shaft 56 extends from the differential 54 and is connected by a flexible coupling 46 to a shaft 60. The shaft 60 and the other of the shafts 48, the axis of which is at right angles to the axis of the aligned shafts 48, are connected by flexible couplings 46 and shaft 64 to a differential 66. A shaft 68 connects the differential 66 through a flexible coupling 46 to the shaft 72 of a motor M1. Bearings 52 support the shafts 48 intermediate their connections to prevent sagging. Through the aforesaid shafts, flexible couplings and differentials, the worms are rotated and caused to raise or lower the structures 20 and 22 by elevation or depression of the screws 40. The several flexible couplings employed are for the purpose of absorbing the twist imparted to the shafts between the motor M1 and the screws 40, so as to enable braking the worm shafts 44 to a stop precisely as the structures reach their lower and upper positions without rebound and without imparting too much strain to the shafts. Braking is effected by electrically operated mechanical brakes 80 (FIG. 4) mounted on the shafts 44. Direct current (DC) operated brakes provided with variable control of the current, for example, by means of a rheostat are employed to enable adjusting the current flow and hence to increase or decrease the braking action. The brakes are activated as the structures are moved to their upper or lower positions by limit switches S3 and S5 which will be described hereinafter. The flexible couplings 46, one of which is illustrated in FIG. 4, are provided between the adjacent ends of axially aligned shafts by securing sprockets 46a to the shafts with their lateral faces parallel and mounting a double link chain 46b about the sprockets. The clearance between the sprocket teeth and the chain links affords a small amount of slack in each coupling and in the several couplings sufficient slack, so that when the brakes 80 are applied rigidly to the worm shafts 44 the twist in the shafts is permitted to unwind without damage to the shafting.

Figure 3:
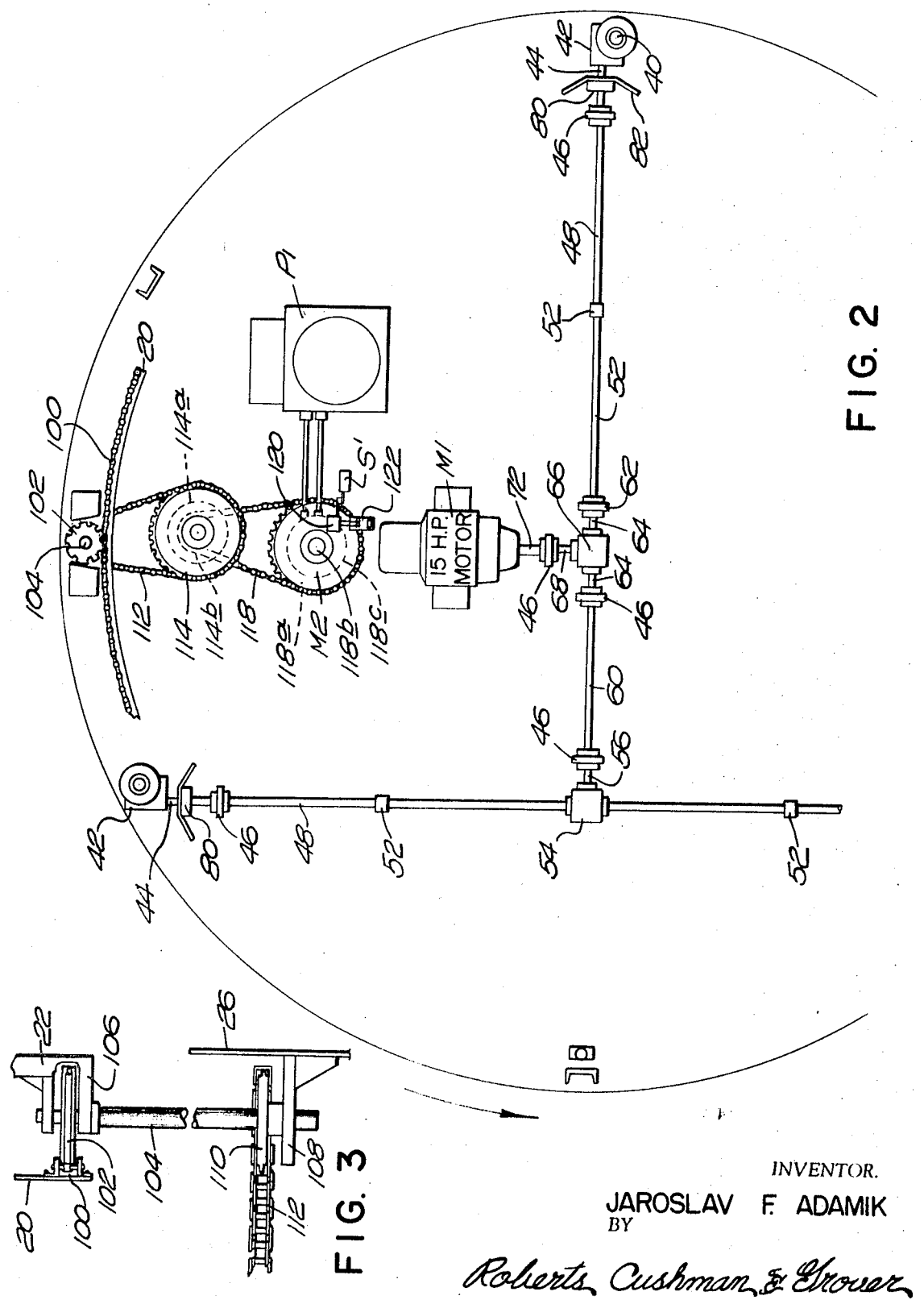
FIG. 3 is a fragmentary vertical elevation showing the drive means for transferring the drive from the base of the machine to the rotor.

Rotation of the rotatable structure 20 is provided for by means of a link chain 100 (FIGS. 2, 3, and 4) fastened to the exterior surface of the structure 20 and a sprocket 102 in mesh with the link chain. The sprocket 102 is secured to the upper end of a spline shaft 104. The upper and lower ends of the spline shaft 104 are journaled in suitable bearing brackets 106 and 108 on the non-rotatable structure 22 and base 26 respectively, and a sprocket 110 is mounted on the spline shaft 104 near its lower end. One end of a link chain 112 is entrained about the sprocket 110 and the opposite end of the chain 112 is entrained about a sprocket 114 (FIG. 2) forming part of a clutch assembly 114a. Rotation of the sprocket 110 will rotate the spline shaft 104, the sprocket 102 and in turn the rotatable structure 20. The spline shaft is freely slidable through the sprocket 110 thus maintaining a driving connection between the clutch and spline shaft while permitting the structures to be moved in elevation. The clutch assembly 114a embodies a sprocket 114b about which one end of a link chain 118 is entrained. The opposite end of the link chain 118 is entrained about a sprocket 118a fixed to the shaft 118b of a fluid pressure-operable motor M2. The motor M2 is supplied with fluid pressure from a pressure source P1, and has on its shaft 118b a disk 118c to which there is fixed a block 120 for a purpose which will appear hereinafter.

Starting with the structures 20 and 22 in their elevated position, as shown in dotted lines (FIG. 1a), the motor M2 rotates the sprocket 118a in a clockwise direction and this, through the chains 118 and 112 and the sprockets 114b, 114, 110, and 102, effects a counterclockwise rotation of the rotatable structure 20. The motor M2 also rotates the disk 118c which carries the block 120 around with it and near the end of one complete revolution of the disc the block 120 strikes the actuator of a switch S1 which operates to reverse the flow of pressure fluid from the source of pressure P1 to the motor M2 and thereby to rotate the disk 118c and the sprocket 118a in a counterclockwise direction. An adjustable stop in the form of a screw 122 is mounted on a fixed part of the base in a position to be engaged by the block 120 just after the later has actuated the switch S1 to bring the motor M2 to a stop preparatory to reversing its direction of rotation. The clutch assembly 114a transmits the drive from the motor M2 only when the motor is turning in a clockwise direction so that reverse rotation of the motor M2 does not transmit power to the spline shaft. When the motor M2 is stopped the clutch assembly allows the rotatable structure 20 to slow down. A plurality of studs 124 (FIG. 7) are mounted on the inner side of the rotatable structure 20 and as the rotatable structure turns one of these studs will strike the actuating element 126 of a switch S2. Actuation of the switch S2 will supply pressure to a fluid pressure-operated motor M3 to raise a fork 124a upwardly into engagement with the stud 124 preceding that in the direction of rotation of the last-mentioned stud as the rotatable structure slows down to engage the stud thereby stopping the rotatable structure 20 and locking it against further rotation in either direction until the fork is withdrawn. The motor M3 is double-acting so that the fork can be disengaged from the stud 124 and is mounted by suitable bracketing on the non-rotatable structure 22. When the fork 124a becomes engaged with the stud 124, the structures 20 and 22 can be lowered from their upper to their lower position and lowering is effected by activation of the motor M1 which lowers the screws 40. As the structures 20 and 22 reach their lowermost position switch plates 128, one of which is fastened to each of the legs 24 strike lower limit switches S3 mounted on the channel member 28 in which the leg slides to stop the motor M1. The structures 20 and 22 will remain in the lower position until the operations which are to be performed at the stations of operation have been completed whereupon the motor M1 will be reversed to effect elevation of the structures 20 and 22.

As the structures 20 and 22 near the upper extremity of their movement cams 130 (FIG. 9) mounted on the legs 24 first engage limit switches S5 to stop the motor M1 thereby terminating upward movement of the structures 20 and 22 and then engage switches S6 which start the motor M2 thereby to cause rotation of the rotatable structure a distance corresponding to the distance between successive stations of operation. At both the lower and upper extremities of movement the electric brakes 80 are applied to bring the structures to a stop without rebound.

The rotatable structure 20 (FIG. 1) referred to hereinafter as the "rotor" has a plurality of peripherally spaced, radially extending bracket plates 140 (FIG. 7) fastened thereto by bolts 142 and these collectively provide support for a generally annular-shaped flat cap plate 144 to which the radial arms 12 are bolted. A relatively flat conical cover 146 (FIGS. 1a, 4, and 7) is mounted on and secured to the cap plate 144 to enclose the top of the machine and contains an opening 148 near one side to permit access to the interior of the machine for adjustments, repairs, and the like.

The arms 12, as previously mentioned, are bolted or otherwise secured to the cap plate 144 so as to extend radially from the center of rotation of the rotor and each arm has near its outer extremity a bearing hole 150 (FIG. 10) and a bearing bracket 152 containing a bearing hole 154. The bearing holes 150 and 154 provide bearings for rotatably supporting a U-shaped bracket 14 between each pair of arms and are so situated that the axis of the bearing hole 150 in one arm is coincident with the axis of the bearing hole 154 in the next arm. The axis of the bearing hole 150 at the end of a given arm and the axis of the bearing hole 154 in the bracket at the end of that arm make an angle which is complemental to the angle between arms. Each bracket 14 is substantially U-shaped, having a back 156 and spaced parallel legs 158, the latter terminating in hubs 160 in which are fixed stub shafts 162. The stub shafts 162 extend through the bearing holes 150 and 154 and thus support the bracket 14 for rotation about a horizontal axis.

Figure 16:
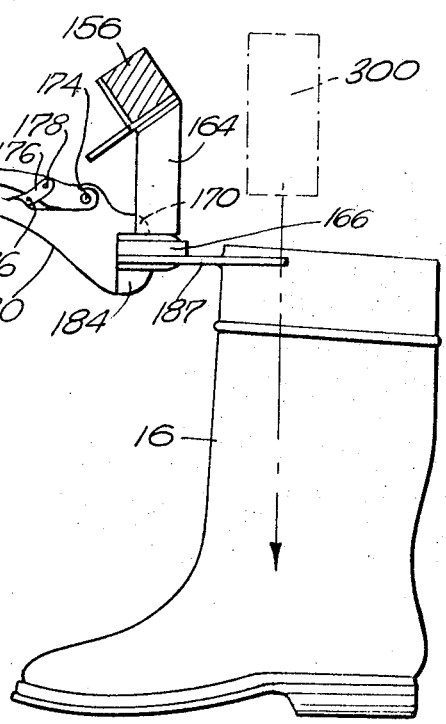
FIG. 16 is an elevation of a mold which in this instance is a boot mold provided with a supporting plate by means of which it may be clamped to a bracket arm and showing in elevation a clamp for clamping the plate to the bracket arm.

Each bracket 14 has secured to the back part 156 transversely spaced limbs 164 (FIG. 10a), to the lower ends of which is fastened a bar 166 which forms part of a clamping means. Quick-release adjustable clamps 168 (FIG. 16) are mounted on the bar 166 for clamping the molds 16 thereto. Each clamp 168 comprises a jaw 170 fastened to the upper side of the bar 166, a lever 172 connected by a pivot 174 to the jaw 170 and a lever 176 connected at one end by a pivot 178 to the lever 172. The opposite end of the lever 176 is supported within a lever 180 against a screw 182. The lever 180 has on it the other jaw 184 and is connected to the jaw 170 by a pin 186. The jaw 184 is adapted to be brought into engagement with the lower side of the bar 166 by swinging the lever 172 about its pivot 174 into parallelism with the lever 180. A lever 171 is pivotally connected by a pin 173 to the lever 176 and provides a quick-release by squeezing to elevate the lever 172. The screw 182 provides for adjustment of the clamping action. To effect suitable clamping each mold 16 has secured to its upper end a rigid plate 187 containing spaced holes 188 (FIG. 21) for engagement with spaced pins 190 on the underside of the bar 166. The jaw 184 when brought into engagement with the bar 166 holds the plate 187 engaged with the pins 190.

During the formation of an article, herein illustrated as an article of footwear, the molds 16 have to be moved to different positions at the several stations of operation and there is means for effecting rotation of the brackets 14 and hence the molds for this purpose. This is accomplished, as illustrated in FIG. 10, by means of a sprocket 192 fastened to the stub shaft 162 about which one end of a link chain 194 is entrained. The opposite end of the chain 194 is entrained about a sprocket 196, the latter being fixed to a shaft 198 supported in suitable bearing members 200a and 200b (FIG. 11). The shaft 198 has fixed to it a hub 202 and on this hub there is fixed in a diametrical position a key 204. Below the shaft 198 there is a post 206 secured in an upright position by a brace 206a which extends rearwardly therefrom through an opening in the base 26.

The post has at its upper end a cylindrical bearing 208 which is adjustably secured thereto by a plate 210 containing slots 212 through which bolts 214 are screwed for securing it in a selected position of adjustment. The bearing 208 contains a shaft 216, on one end of which there is a hub 218 and spaced parallel bars 220 which form a keyway 220a adapted to receive the key 204. The opposite end of the shaft 216 has on it a sprocket 222 and one end of a chain 224 is entrained about the sprocket, the opposite end being entrained about a sprocket 226 fixed to a shaft 228 of a fluid pressure-operated motor M4. The motor M4 is fastened to a bracket plate 230, the latter being secured to the post 206. The motor M4 is fluid-operable and is provided with an inlet (not shown) and two outlets 236 and 238 so that it may be rotated in either one direction or the other by opening and closing of the outlets 236, 238. The key and keyway 204, 220a provide a separable driving connection between the shaft 198 and the shaft 216 thereby enabling the structures 20 and 22 to be elevated for movement from one station to the next without changing position and then lowered at the next station of operation for rotation if such manipulation is a part of the operation. In order to hold the molds stationary while the structures are in their upper position and/or in those stations of operation where manipulation of the molds is not necessary, there is braking means (FIGS. 10 and 11) comprising a brake disk 240 fastened to each shaft 198. A brake block 242a is secured to the underside of one of the arms of each pair of arms 12 parallel to one side of the brake disk 240. At the other side of the brake disc there is a short shaft 243 rotatably supported in the bearing member 200b. The bearing member 200b has on its inner side, facing the brake disk, an inwardly sloping cam surface 244 and the shaft 243 has on its inner end a brake block 242b which is rotatable by rotation of the shaft 243 between the cam 244 and the brake disk 240 to jam the latter against the brake block 242a. The shaft 243 has fixed to its outer end an arm 248 and this is normally held in a position such that the brake block 242b is pressed against the brake disk by a compression spring 250 supported between a cup 252 secured to the arm 12 and a cup 254 secured to the arm 248. If it is necessary to rotate the bracket 14 without power, the arm 248 may be raised in opposition to the spring to rotate the brake block 242b away from the cam surface 244 thus to disengage it from the brake disk 240. Under operating conditions the brake is released as the structures move downwardly by engagement of the arm 248 with a fixed stop 248a situated below on a bracket arm 248b. Adjustment of the stop 248a enables varying the braking action.

Each bracket 14 is mounted between a pair of arms 12 as previously stated and these arms are moved with the rotor from station-to-station throughout an entire revolution of the rotor to present the molds supported thereby successively to the several stations which will now be described.

There are 18 stations of operation which comprise a stripping station 18A; a first plastisol filling station 18B; a first gelling station 18C; a second gelling station 18D; a moisture evaporating station 18E; a plastisol dumping station 18F; a drip recovery station 18G; a first partial curing station 18H; a second plastisol filling station 18I; a distribution station 18J; a second partial curing station 18K; five final curing stations 18L to 18P; a washing station 18Q; and a preheating station 18R. Optionally, station 18Q or station 18R may include adhesive spraying. The station 18E also provides for moving all of the preceding stations in the direction of rotation to provide an extra station adjacent the stripping station in the event that stripping becomes difficult and requires the space of two stations for completion.

Adjacent the first station, that is the stripping station 18A, there is a control console (not shown) embodying a bank of switches by means of which the machine may be programmed to move the molds from station to station at a predetermined rate; to effect tilting of the molds at those stations where tilting is part of the operation; to effect movement of the plastisol charging means into operative position for filling the molds at the stations where filling is carried out; to turn the heating elements on and off at the gelling and curing station and to maintain the temperatures of the various heating elements at the desired level. As previously related, during normal operation the rotor 20 and rotor support 22 are moved up and down between successive stations and the rotor is moved from one station to the next while the rotor and rotor support are in their up position. The vertical movement is to enable elevating the molds away from the apparatus at the several stations while they are being moved from one station to the next to clear the apparatus and for lowering them at the stations in certain instances into cooperative relation with the apparatus as will appear hereinafter.

At the first station 18A (FIG. 1) there is a platform 260 on which an operator can stand for the purpose of stripping the finished articles from the molds which have just completed a cycle of operation. If the same molds are to be used for the next cycle they are left in place; however if different molds are to be employed they may be substituted at this station for those previously used. One of the advantages of this machine resides in the fact that molds of different size and/or kind may be mounted together for treatment at the successive stations.

Following stripping the empty molds are moved upwardly from station 18A, horizontally from station 18A to station 18B and then downwardly to a position adjacent the filling apparatus at this station for filling. At his station the molds are initially tiled to incline the bottoms downwardly from heel to toe and when the toes have been filled the molds are righted and filling is continued up to the desired level. The tilting is to enable filling the toes without trapping air and to avoid turbulence by running the plastisol down the sides of the molds rather than cascading it to the bottoms. The filling apparatus which will be described in greater detail hereinafter is moved forwardly and downwardly from a retracted position to a position above the open tops of the molds, movement being initiated by the programming referred to above. The plastisol is delivered from an overhead main supply tank shown diagrammatically in FIG. 22 by gravity or under pressure to the nozzles and discharge from the nozzles is initiated by trigger means on the nozzles which are tripped by contact with the molds to open the valves in the nozzles. Floats associated with the nozzles operate when the plastisol reaches a predetermined depth to close the valves.

The filled molds are now elevated and moved to the next station, to wit, the station 18C. At this station the molds are lowered into a bath which comprises a tank containing water or some other appropriate fluid material which may be heated to a temperature such as to initiate gelling of the plastisol on the interior surfaces of the molds. A salt bath is expedient for most purposes and such a bath is described herein but without limitation.

Following the initial gelling operation the molds are elevated and moved to the next station 18D. At this station the molds are lowered to a position above a gas heater where the naked flames of burning gas are directed against the lower portions of the molds at the heel ends to effect additional gelling in this area and at the same time to evaporate the moisture clinging to the exterior surfaces of the mold from previous baths. The length of time that the gas burners are on is determined by a variable timer.

From the gas heating station 18D the molds are first elevated and then moved to the next station 18E. At this station the molds are lowered but no operation is performed other than to allow the gelled layers to become somewhat further gelled by absorbing hear from the the walls of the molds and to permit further evaporation of the moisture from the surfaces of the molds.

Following station 18D the molds are elevated and moved to the next station 18F. At this station the molds are lowered to a position above a tray and then inverted to dump the ungelled liquid plastisol therefrom onto the tray. Inversion of the molds at this station is effected as part of the sequence of operation initiated at the console.

Following dumping the molds are elevated while still inverted, moved laterally to the next station 18G and then downwardly to a position above an extension of the tray at station 18F to catch any drip of plastisol which may occur. A recovery tank is provided for receiving the plastisol dumped into the tray and returning it together with fresh plastisol for reuse as will appear hereinafter.

At the next station 18H the molds still inverted are moved to a position beneath a horizontal bank of electric heating elements and then lowered to a position opposite a vertical bank of electric heating elements. The heating elements apply heat to the bottoms and sides of the molds to effect a partial curing of the previously gelled layers. Optionally there may be two vertical banks of electric heating elements, one at the front and one at the back.

From station 18H the molds are raised and moved laterally to the second filling station 18I. At this station the molds are turned right-side-up and simultaneously filling means embodying filling nozzles are moved into a position to inject a predetermined quantity of liquid plastisol into the molds for the purpose of reinforcing certain areas of the bottom, to wit, the shank and counter portions and to fill the heel pockets. This is achieved by tilting the molds to incline the bottoms upwardly from heel to toe to confine the liquid plastisol as it is injected to the shank and heel end portions for a sufficient length of time to form an appreciable coating and then righting the molds to confine the residue to the heel pockets. The quantity of plastisol injected at this station is predetermined for the size and kind of mold employed and injection is initiated by setting an appropriate switch on the console.

The molds are now moved to the next station 18J where the tilting is repeated, that is, the molds are tilted to incline the toes upwardly relative to the heel to thereby redistribute the still liquid plastisol at the bottom to form a second layer on the first layer and then righted to collect the remainder or residue in the heel pockets. Just enough liquid plastisol is employed to form the desired additional stiffening or thickness at these areas and to fill heel cups so that it is not necessary to dump any of the plastisol out.

Following the second distribution of plastisol at station 18J the molds are moved to station 18K where there are gas heaters which project naked flames of gas on the lower or undersides of the molds especially at the heels so as to initiate curing of the rather thick layer of plastisol in the heel cups and on the shank and counter areas. Supplemental heat is also applied to the upper open ends of the mold by electric heating elements located above the molds to initiate curing near the tops of the molds.

Following this partial curing the molds are moved successively through the five curing stations 18L to 18P in each of which they are submerged in a bath, for example, a salt solution, maintained at a predetermined temperature so that after passing through these five stations the articles are completely cured.

Following the fifth curing station 18P the molds are moved to station 18Q and submerged in a water bath for washing the exterior surfaces of the molds to remove, for example, the salt as where the baths are salt baths. When a salt solution has been employed in the curing baths the salt may be recovered by precipitation.

The molds are then moved to station 18R, the final station of operation, where they are immersed in a water bath to either preheat or precool them to a temperature such that when they arrive at the filling station 18B they will be at a temperature consistent with filling. At either the washing station or the preconditioning station, since the molds are upright the interiors of the cured articles, particularly if they are articles of footwear, may be sprayed with an adhesive for the purpose of subsequently securing linings therein.

The finished articles are stripped at station 18A and then placed on suitable conveyors for transportation to a trimming station for trimming the open ends of the boots, to a lining station for insertion of linings and, if desired, to a spraying station for applying a special finish to the exterior surfaces thereof.

Optionally, flocking of the interior of the articles, for example boots, may be incorporated in the sequence of operations, for example, by filling the molds at station 18I with plastisol as was done in station 18B, dumping the plastisol at station 18J by inverting the molds, righting the molds at station 18K and then coating the interior of the articles with flock while the plastisol is still tacky by inserting suitable flock-injecting nozzles into the open tops of the molds at station 18L. One of the curing stations will have to be sacrificed when the flocking operation is included. However since the boots are generally thinner when flocking is applied to the interior, curing can be effected satisfactorily even though one of the curing stations is omitted.

The operations performed at the several stations will now be described in detail with reference to the specific mechanism for carrying them out.

Figure 12:
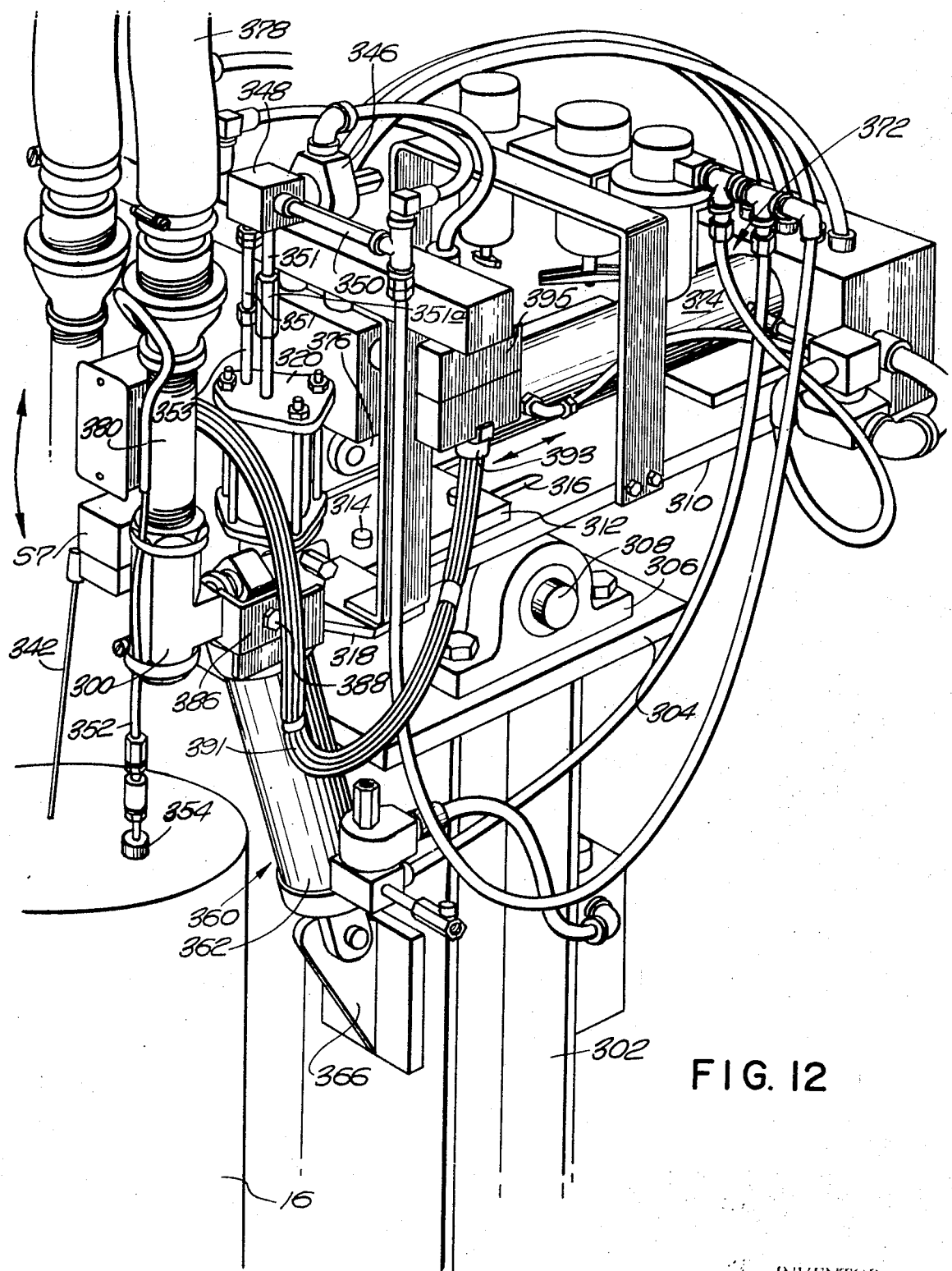
FIG. 12 is a perspective of the first filling apparatus by means of which liquid plastisol is supplied to the molds.

At station 18B (FIG. 12) the filling apparatus comprises a plurality of nozzles 300 supported at the top of a pedestal 302 for movement forwardly and downwardly from a retracted position to a position directly above the open tops of molds 16 supported by the bracket 14 to which they are clamped. The pedestal 302 is lagged to the floor adjacent the base of the machine and has at its upper end a cap plate 304 to which there are bolted transversely spaced bearings 306 which in turn support a shaft 308. A rocker arm 310 is secured to the shaft 308 with portions extending forwardly and rearwardly thereof and this in turn supports a slide plate 312, the latter being connected to the rocker arm 310 by bolts 314 extending through it and through a slot 316 in the rocker arm 310. The slide plate 312 has secured to its forward end an upwardly inclined part 318 terminating in a horizontal part 319 on which the nozzles and four air pressure-operable cylinders 320 are mounted, one for each of the nozzles 300. Each of the nozzles 300 contains a ball valve 322 (FIG. 13) containing a diametrical hole 324 and each ball valve is provided with a stem 326 by means of which it may be rotated to position the hole 324 in alignment with a discharge passage 301 in the nozzle 300. The stems 326 extend rearwardly from the nozzles through bosses 328 and into telescoping engagement with shafts 332 extending forwardly from the lower ends of the cylinders 320. The shafts 332 are journaled for rotation in hollow extensions 334 at the lower ends of the air cylinders 320 and have fixed to their lower ends within the hollow extensions gears 336. The air cylinders 320 contain pistons and rods and the latter protrude through the lower ends of the cylinders into the hollow extensions 334 and have on them racks 338 which mesh with the gears 336. By supplying pressure to the upper ends of the cylinders 320 the piston rods may be moved downwardly to effect rotation of the shafts 332, the stems 326 and the ball valves 322 to place the holes 324 in positions to effect discharge and by supplying pressure to the lower ends of the cylinders the parts may be reversed to rotate the ball valves in a direction to terminate discharge. Discharge is effected automatically as the nozzles are moved into a position above the open ends of the molds and terminated automatically when the level of the plastisol reaches a predetermined level. Discharge is initiated for each nozzle by a trigger wire 342 which extends from a switch S7 fastened to the nozzle. Displacement of this trigger wire activates the switch S7 and this in turn activates a solenoid 346. Activation of the solenoid 346 displaces a valve element in a valve 348 mounted on the slide in a direction to supply fluid pressure from a conductor 350 through a conductor 351 to the upper end of the cylinder 320. Discharge is terminated by a float 354 loosely mounted at the lower end of a sealed tube 352, the latter being mounted on and projecting downwardly from the nozzle into the open end of the mold. The weight of the float 354 is partially neutralized by a coiled spring 356 so that its effective density is sufficiently different from that of the plastisol to ensure flotation under any conditions. The float has a magnet 358 recessed into its upper end and within the sealed tube there are relatively movable electric contacts which are adapted to be closed by movement of the magnet 258 upwardly on the closed tube to complete a circuit through wires enclosed within the tube 352 and the switch S7 to again activate the solenoid 346 this time so as to displace the valve element within the valve 348 in a direction to deliver pressure through a conductor 353 to the lower end of the cylinder 320. Desirably the conductor 351 from the valve 348 to the cylinder 320 embodies a bleeder valve 351a by means of which the pressure supplied to the cylinder 320 may be controlled so that the rate of opening of the ball valve in the nozzle may be adjusted to maintain a smooth non-turbulent flow of the plastisol from the nozzle into the mold.

Between successive filling operations the rocker arm 310 is supported in an upwardly and forwardly inclined position relative to the rotor 20 by means of a piston and cylinder assembly 360 comprising a cylinder 362 pivotally connected by a pin 264 to a bracket 366 on the pedestal 302 below the cap plate 304 and a piston rod (not shown) extending from the cylinder 362 pivotally connected to the forward end of the rocker arm 310. The cylinder is double-acting so that by supplying pressure to its lower end the piston rod is extended and the rocker arm 310 tilted upwardly about the axis of the shaft 308 and by supplying pressure to the upper end the piston rod may be retracted to lower the rocker arm 310 to substantially horizontal position. While the rocker arm is tilted upwardly the slide plate 312 is held in a retracted position relative to the rocker arm 310 by a piston and cylinder assembly 372 comprising a cylinder 374 secured to the rocker arm 310 rearwardly of the slide plate 312 and a piston rod 376 protruding therefrom which is connected to the slide plate 312. The cylinder 374 is double-acting so that pressure supplied to the rear end will project the piston rod forwardly which, in turn, moves the slide plate 312 forwardly and by supplying pressure to the forward end will retract the piston rod and consequently retract the slide plate 312. The combined forward and downward movement of the slide plate 312 and the rocker arm 310 moves the nozzles 300 forwardly and downwardly to a position directly above the upper open ends of the molds 16. Pressure is supplied to the cylinders 362 and 374 at the appropriate time by the programming means on the control console. The plastisol is delivered gravitationally or by pressure to the nozzles 300 through flexible pipes 378. One end of each pipe is connected by a coupling 380 to a nozzle and the other end extends upwardly to an elevated supply reservoir 382 supported on a trestle 384 rearwardly of the pedestal 302.

Figure 13:
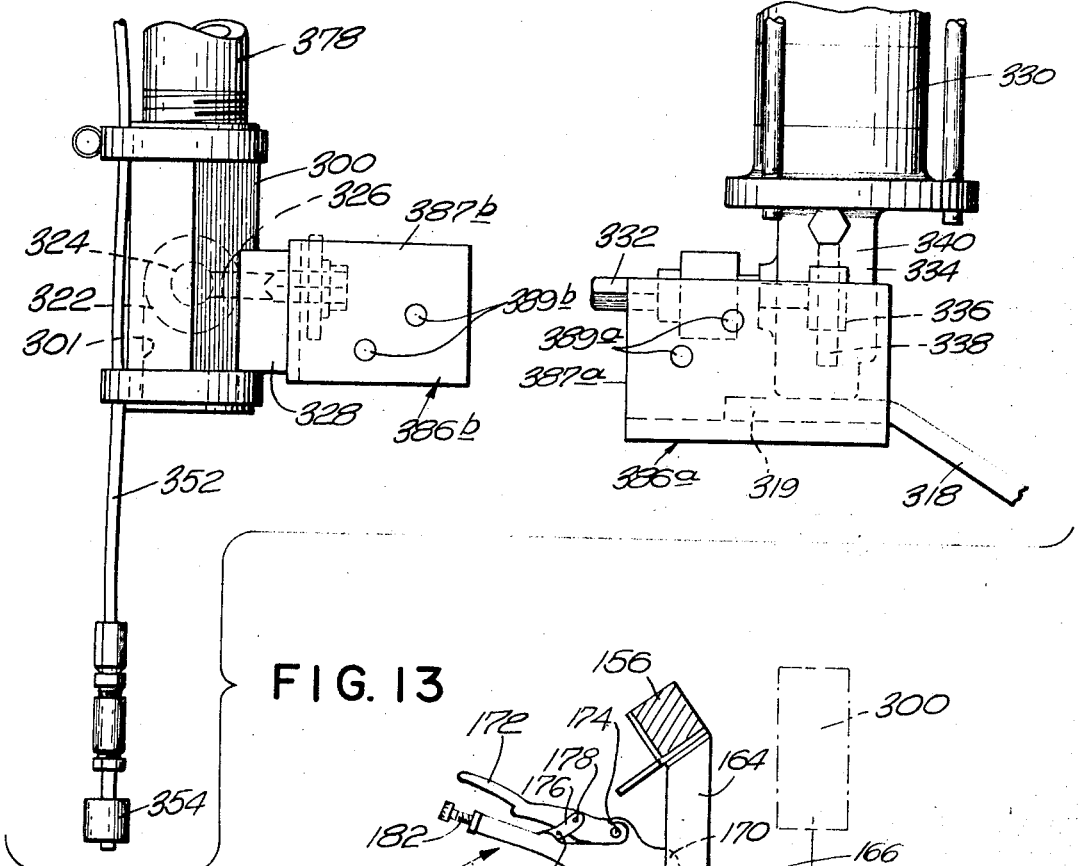
FIG. 13 is a fragmentary elevation of one of the nozzles through which the liquid plastisol is injected into the open ends of the molds and an air cylinder designed to open a valve in the nozzle, the nozzle and air cylinder being shown disengaged.
Figures 14, 15:
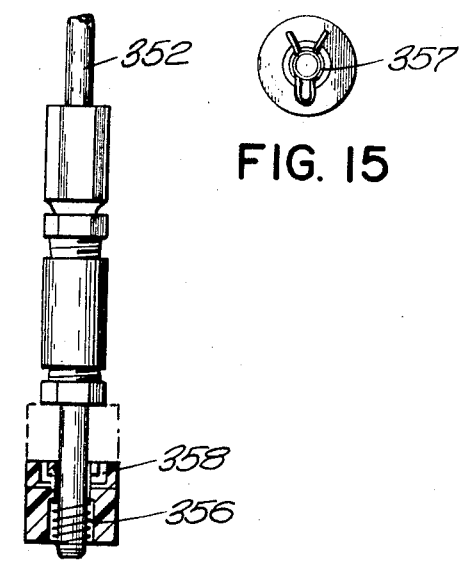
FIG. 14 is an elevation partly in section showing the details of the float by means of which the flow of plastisol through the nozzle is terminated.
FIG. 15 is a bottom view of FIG. 14.

As previously stated, there are four nozzles 300 at the filling station, each of which is supplied with liquid plastisol independently of the other and each of which is provided with a trigger finger and a float to initiate and terminate flow of the plastisol. In order to make the machine as versatile as possible, the nozzles 300, together with the trigger fingers 342, floats 354 and switch S7 are detachably mounted on the forward end of the slide plate 312 by means of brackets 386a and 386b (FIG. 13). The bracket 386a is fastened to the underside of the part 319 and has upwardly extending arms 387a containing bolt holes 389a. The bosses of the nozzles are fastened to the back of the bracket 286b and it has rearwardly extending ends 387b containing bolt holes 389b. The ends of the brackets are interchangeable and are normally held bolted together by bolts 388. By removing the bolts the bracket 386b may be detached from the bracket 286a so that the nozzles and the conductor pipes 378 attached thereto may be swung to one side and another set of nozzles substituted therefor. The detachable mounting for the nozzle enables employing different color plastisols without having to clean the nozzles and conductors previously used by simply mounting a number of main supply tanks 382 on the trestle 384, each with a battery of conductor pipes and nozzles and by substituting one set for another when a change of plastic and/or colors is desired. By reason of this arrangement, that is two or more main supply tanks, it is possible to inject two or more colors at the same time in a set of molds to that different color boots or articles can be made at the same time.

The telescoping portions of the stems 326 and shafts 332 are of non-circular cross-section to afford a driving connection between the two and yet to permit detachment of the nozzles when desired. The wires for the several switches are gathered to form a cable 391 and this is provided with a jack 393 by means of which it is detachably connected to a terminal box 395 mounted on the slide plate. The foregoing structure is disclosed and claimed in my pending application Ser. No. 614,587, filed Feb. 8, 1967.

Following filling of the molds to the level controlled by the floats 354, the slide plate 312 and the rocker arm 310 are elevated and retracted respectively.

Figure 17:
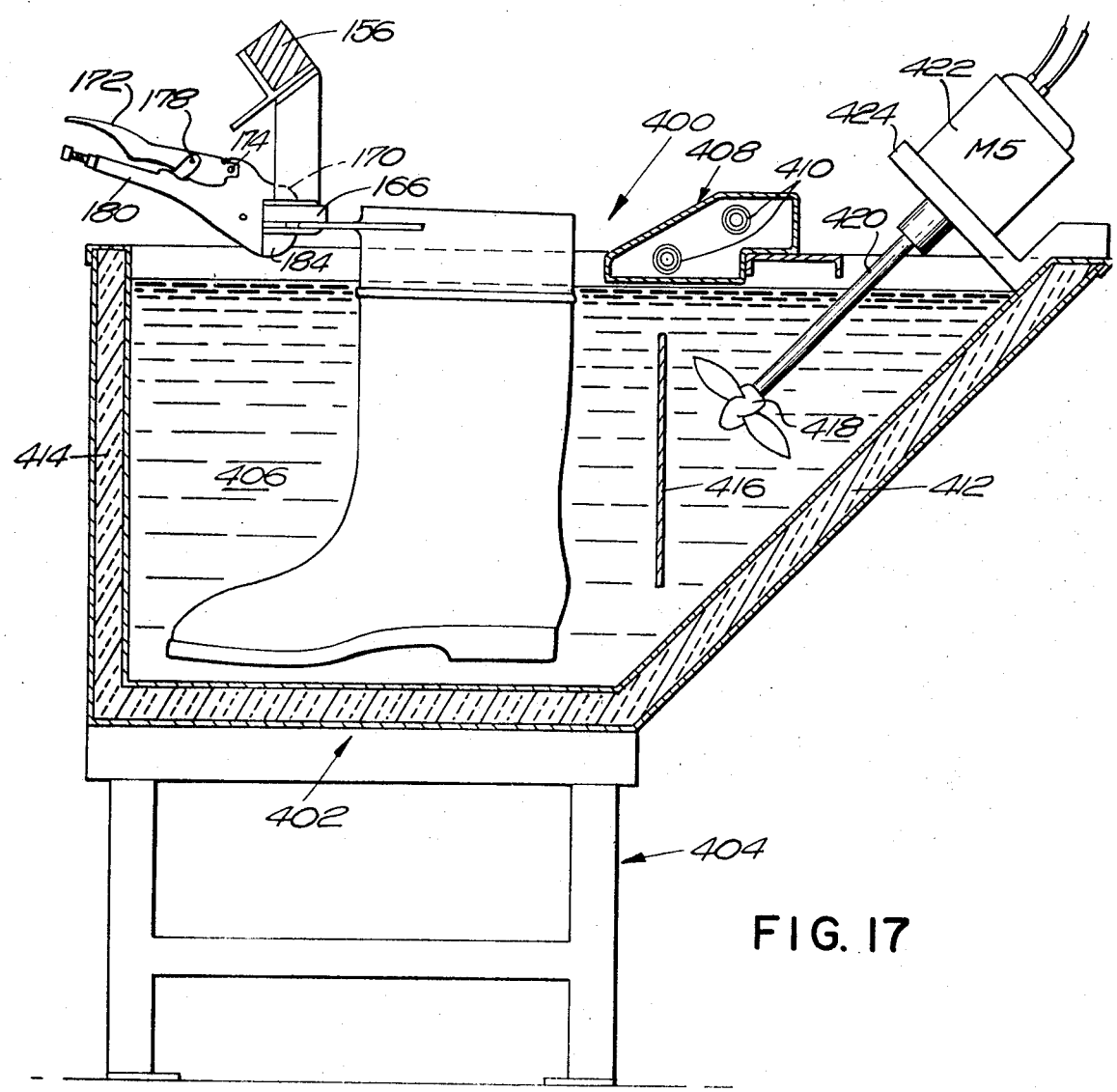
FIG. 17 is a vertical section through a salt bath showing a mold submerged therein and means for effecting circulation of the salt solution.

At the first gelling station 18B the molds are lowered into a bath 400 which may comprise, as shown in FIG. 17, a salt solution 406 contained in a tank 402 mounted on a stand 404. The salt solution is a solution of water and salt, for example, salt under the trade name Hytec, manufactured by DuPont may be used. It is to be understood however that any suitable material may be employed for raising or lowering the temperature of the bath so that it may be maintained at a level consistent with gelling of the plastisol. As herein illustrated, a heating unit 408 is mounted across the top of the tank 402 containing heating elements 410 for heating the salt solution to the desired temperature for applying heat to the exterior of the molds submerged therein to start the gelling operation. The tank 402 is designed to enable maintaining the level of the salt solution substantially constant as the molds are lowered into it and to this end the rear wall 412 is inclined rearwardly with respect to the front wall 414 so that as the molds are lowered into it the greater part of the volume of liquid displaced by the molds is taken up by the relatively large increase in area to depth ratio provided by the rearwardly inclined wall 412. The tank is also designed to provide for maximum uniformity of temperature throughout the liquid bath and thus to make it possible to obtain a relatively uniform gelled layer on the interior of each mold. This is achieved by placing a baffle plate 416 in the tank in a vertical position parallel to the front wall 414 and near the rear wall 412 with its upper end lower edges respectively below and above the top and bottom of the tank, and by mounting an agitator in the form of a propeller 418 in the space behind the baffle 416, that is between the baffle 416 and the inclined rear wall 412. The propeller 418 is fixed to a shaft 420 driven by a motor M5 fastened to a bracket 424, the latter being bolted to the rear wall 412. The propeller 418 drives the heated solution downwardly about the lateral and lower edges of the baffle into the space forwardly of the baffle, upwardly about the molds, and then rearwardly over the upper edge of the baffle where it is reheated and then recirculated. Constant circulation of the liquid by means of the propeller 418 and maintenance of the level at substantially the upper level of the plastisol in the molds produces a uniformly thick initial layer of gelled plastic on the interior walls of the molds. The molds are exposed to the salt water bath for a period determined by the dwell between stations of operations and then withdrawn from the bath and moved to the next station.

At station 18D the molds are lowered to a position directly above a gas heating unit 426 (FIGS. 1 and 18) which is so constructed as to direct naked flames of burning gas at the heel ends of the molds and against the bottoms of the molds. The unit 426 is made up of two independently operable banks of burner pipes 428, the pipes in each bank being arranged in parallel relation to each other on a supporting base 430 by means of vertically adjustable rods 432 so that it is possible by adjustment of the rods 432 to raise or lower each of the banks of pipes independently of the other thus making it possible simultaneously to apply heat to molds of different vertical depth. Gas is supplied to the two banks of burners through independent flexible conductors 434 and delivery of gas to the burners is controlled from the console so that the burners are in operation only while the molds are located in position above them. In other words, the burners are turned on and off in consonance with the movement of the molds into position above them and movement of the molds away from them. Pilot lights are provided so that when the gas is turned on the burners will automatically ignite. The heat applied by the burners as heretofore explained is to increase the thickness of the gelled layer and the bottom and heel end to provide adequate thickness for the sole and heel.

At station 18E the heat applied at the previous station is allowed to penetrate from the exterior through the metal walls of the molds to the interior to complete gelling of a layer of suitable thickness on the interior walls of the molds. No heat is added at this station, although if it were found desirable to add heat a supplementary heater could be placed at this station.

At station 18F the molds are inverted by a mechanism such as that shown in FIG. 10 for rotating the bracket 14. At this station there is a shallow tray 436 (FIG. 21) which extends from this station in the direction of rotation to include the next station 18G. At station 18F where the liquid plastisol is dumped by inversion of the molds there is a screen 438 supported in spaced relation to the bottom of the tray onto which the plastisol is dumped, the purpose of which is to remove any foreign material or solid particles which may have been accidentally dropped into the molds between the time of filling and the time of dumping at this station. The molds remain in their inverted position at this station and also at the next station. The portion of the tray 436 at the next station is provided to catch drip which is bound to occur following the discharge of the major portion of the plastisol. The plastisol which is dumped from the molds is suitable for reuse and to this end is drained from the tray 436 into a recovery tank 440 where fresh plastisol is added to it and the mixture returned to the main supply tank 382. A plurality of baffle plates 442 are fastened to the bottom of the tray to retard the flow of plastisol, minimize turbulence and remove as much of the air which becomes trapped therein as possible before it reaches the recovery tank 440. The recovery tank 440 contains a narrow opening 44 at the top and an inclined through 446 in the outer wall of the tray discharges the liquid plastisol through the opening into the recovery tank 440. If two colors are employed at the same time the tray 436 will have to be divided to return one color plastisol to one recovery tank and the other color to another recovery tank.

The recovery tank 440 is designed specially to eliminate as much of the entrained air from the liquid plastisol as possible and to this end is divided into two compartments 448 and 450 (FIG. 22) respectively, by a vertical partition 452 adjacent the end in which the opening 444 is located. Within the compartment 448 there is an inclined baffle plate 454, the upper inclined surface of which is directly below the opening 444 so that the liquid plastisol flowing through the opening 444 falls onto this surface and is conducted to the bottom of the compartment 448 with a minimum amount of agitation. The partition 452 is not as high as the tank so that the liquid plastisol flows over its upper edge into the compartment 450. In the compartment 450 there are a plurality of sets of inclined spaced parallel baffle plates 456, each set comprising a baffle 456a, the upper edge of which abuts the top of the tank and the lower edge of which is spaced from the bottom of the tank, and a baffle 456b, the upper edge of which is spaced from the top of the tank and the lower edge of which abuts the bottom of the tank. These baffles extend from side wall to side wall so that the plastisol which arrives in the compartment 450 is caused to flow in a circuituous path upwardly between the first set of baffle plates 456 downwardly between the baffle plate 456b of the first set and the baffle plate 456a of the second set, upwardly between the second set of baffle plates 456 and downwardly between the baffle plate 456b of the second set and the baffle plate 456a of the third set and from thence onwardly in the same fashion through the baffle plates of the third, fourth and fifth series of baffle plates to the end of the tank. The baffles 456b diminish in height from the first at the left of the tank to the last at the right of the tank as seen in FIG. 22. The arrangement of the baffle plates is such as to cause the plastisol to move upwardly over the inclined surfaces of the plates at a faster rate than it flows downwardly between the sets of baffle plates, thus promoting and permitting air bubbles to escape from the plastisol.

At the right-hand end of the tank as seen in FIG. 22, there is a suction tube 458 for removing plastisol from the recovery tank 440 and returning it to the main supply tank 382. Before returning the used plastisol it is desirable to add fresh plastisol thereto to dilute it so that it will be more readily mixable with the fresh plastisol in the main supply tank 382 and also to remove as much air from the plastisol as possible since the presence of air in the plastisol produces pores in the product which in the case of boots is highly undesirable. As herein shown, there is an auxiliary tank 462 shown diagrammatically in FIG. 23 containing a fresh supply of plastisol. A conductor 464 and vacuum pump P2 are provided for drawing plastisol from the tank 462 and delivering it to the tank 440 for addition to the used plastisol. A float F3 in the tank 440 is operable through a suitable linkage 468 to activate a switch S8 to close the valve V1 and stop the pump P2 when the level of the plastisol in the tank 440 reaches a predetermined height. A second float F1 also mounted in the tank 440 is operable when the plastisol falls below a low level such that air might be sucked into the pipe 458 to close a Jamesbury valve J1. When the level of plastisol is adequate the valve J1 is opened and plastisol is evacuated from the recovery tank 440 into a vacuum tank 484, the latter being maintained at a vacuum of about 25 inches of mercury by a vacuum pump 468.

The vacuum tank 484 has at its bottom a conductor 470 which extends to the top of the main supply tank 382 and includes in its length a Jamesbury valve J2 and a screw pump P3. A double float F4 and F5 is mounted in the vacuum tank and when the level therein is too high the float F4 operates to close the valve J1 so that no more plastisol is delivered to the vacuum tank. When the level in the vacuum tank becomes too low, the float F5 opens the valve J1 to permit plastisol to flow into the tank under the vacuum therein. A float F2 is mounted in the main supply tank and operates to actuate the pump P3 to draw the plastisol from the vacuum tank into the main supply tank and to close the valve J2 and stop the pump P3 when the level in the tank reaches a predetermined height.

The circuit for the pump and valve of the recovery system is illustrated diagrammatically in FIG. 24. It is to be understood, however, that both the recovery system and the control therefor as illustrated are not to be intended as restrictive in any sense but merely as illustrative and other and equally useful recovery stems and circuit are described in my pending application Ser. No. 638,922, filed May 16, 1967.

At station 18H (FIG. 19) the molds are exposed while still inverted to heating. A stand 508 at this station supports an upright framework 510 on which there is a vertical bank of electric heating elements 514 and a horizontal framework 512 on which there is a horizontal bank of electric heating elements 516. The heating elements 514, 516 effect partial curing of the gelled layers to a soft cheese-like consistency. Optionally a bank of heating elements similar to the bank 514 may be supported at the inner side of the stand 508 so as to apply heat to the near sides of the molds as well as to the front sides.

Figure 25:
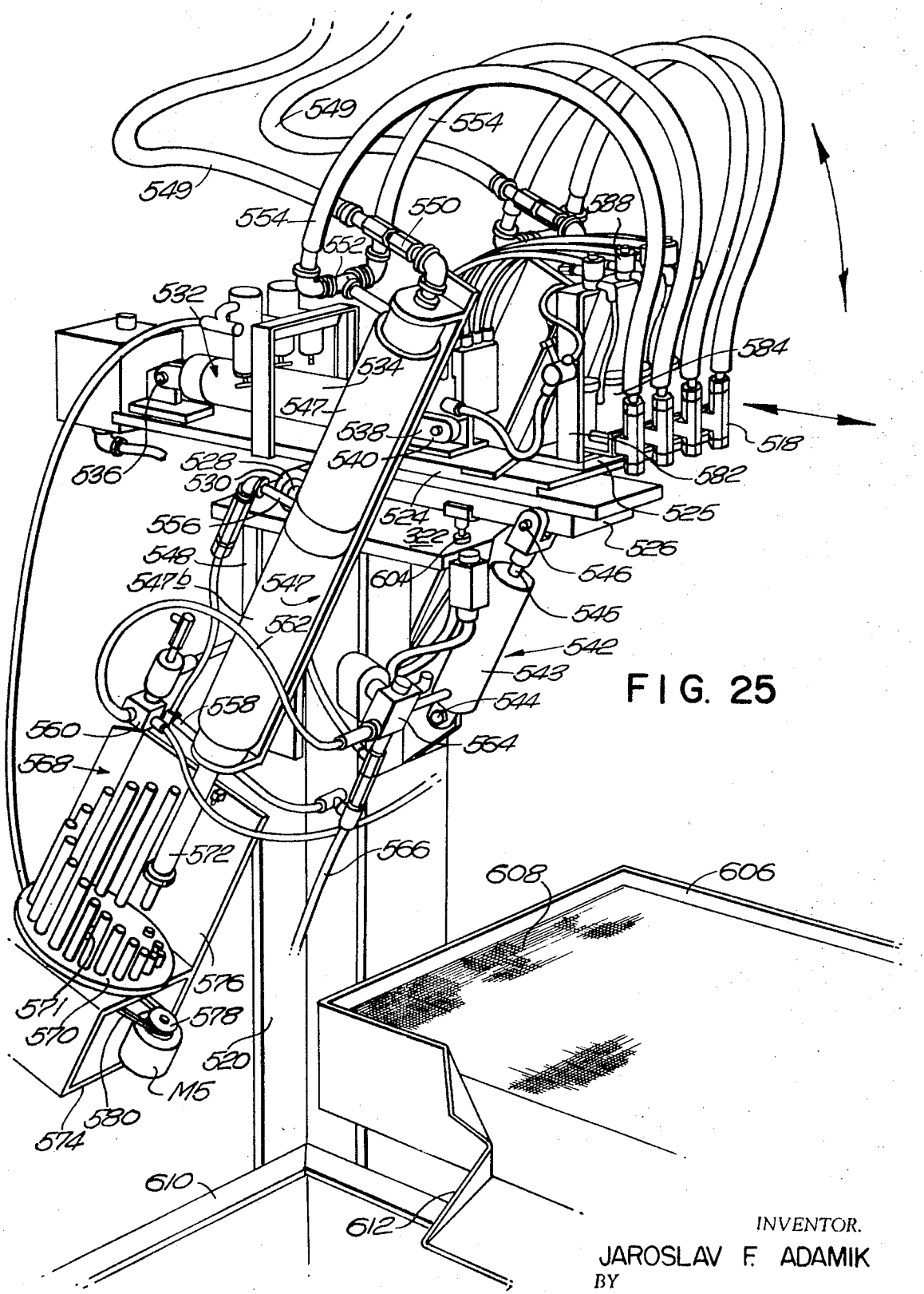
FIG. 25 is a perspective view of a second plastisol charging apparatus wherein a predetermined quantity of plastisol is introduced into the partially cured article, including means for recovering the drip at this station.

At station 18I the molds are turned right side up by means of a mechanism corresponding to that previously described with reference to FIG. 10 whereupon a predetermined charge of plastisol is injected into the upright molds for the purpose of applying reinforcement to predetermined areas. The articles being molded are boots and the areas desirably to be reinforced are the shank, counter and heel portions. The amount of plastisol necessary for this purpose is predetermined and is injected through nozzles 518 at this station which are supported, as will not be described with reference to FIG. 25, for movement to a position above the open upper ends of the molds as the latter are moved into position at this station of operation. The nozzles 518, of which there are four, are similar to the nozzles 300 at station 18B and contain ball valves which are operable by rotation to provide open passages through which the plastisol is injected into the open top of each mold. The nozzles 518 are mounted on a slide plate 524 movable forwardly and rearwardly on a rocker arm 526, the latter being pivotally supported for tilting or rocking motion about a horizontal axis on a horizontal shaft 528 supported in bearings 530 secured to a cap plate 522 at the upper end of a pedestal 520. The base of the pedestal is lagged to the floor. Forward and rearward movement of the slide plate 524 is effected by a piston and cylinder assembly 532 comprising a cylinder 534 pivotally connected at its rear end to the rocker arm by means of a pin 536 and the forward end of a piston rod 538 which is pivotally connected by a pin 540 to the rear end of the slide plate 524. The cylinder 534 is double-acting so that pressure supplied to the rear end moves the slide plate forwardly and pressure supplied to the forward end moves the slide plate rearwardly. Tilting of the rocker arm 526 is effected by a piston and cylinder assembly 542 comprising a cylinder 543, one end of which is pivotally connected by a pin 544 to the pedestal 520 and the upper end of a piston rod 545 which is pivotally connected by a pin 546 to the forward end of the rocker arm 526. The cylinder 543 is also double-acting so that pressure supplied to the lower end raises the rocker arm and pressure supplied to the upper end lowers the rocker arm.

The filling means provided at this station differs somewhat from that at station 18B since a predetermined quantity of plastisol must be injected which is just enough to coat the areas desired, that is, the shank and counter and to fill the heel pocket without an excess which would have to be removed by dumping. This is accomplished herein by employing a metering pump for each pair of nozzles. The metering pumps, one of which is indicated at 547, are mounted on depending plates 548 which extend downwardly from the cap plate 522 at opposite sides of the pedestal. These metering pumps operate to suck a predetermined quantity of plastisol into their upper ends and then discharge this same quantity from their upper ends through the nozzles 518. The plastisol is drawn from a suitable auxiliary reservoir (not shown) through flexible conductors 549 into the tops of the pump cylinders through couplings 550 which contains check valves which permit intake from the conductors 549 but prevent back flow. After the charges have been drawn into the pump cylinders they are discharged through couplings 552 containing check valves which permit the plastisol to flow on the upstroke in equally divided amounts through flexible conductors 554 to the nozzles 518 at the ends of these flexible conductors. Each metering pump 547 comprises tandemly arranged pistons operating in separate chambers, the upper chamber 547a, as shown in the drawing, containing the piston for taking the plastisol in on the downstroke and ejecting it on the upstroke. Conductors 566 and 558 are provided for supplying air to the upper and lower ends of the air chamber 547b and these are connected by way of a valve 560, conductor 562 and junction 564 to a conduit 566 which supplies the pressure necessary.

The quantity of plastisol drawn into each metering chamber is controlled by the length of stroke of the drive piston and the length of stroke is controlled by pin gauges of predetermined length. The pin gauges, which are of graduated length and which are collectively identified by the reference character 568 (FIG. 25), are set at their lower ends into a plate 570 mounted for rotation about an axis parallel to the axis of the metering pump. A rod 572 extends from the lower end of the metering pump and the gauge pins are so disposed that rotation of the plate 570 will move the pins successively into alignment with the lower end of the rod 572. Disposition of a pin beneath the rod 572 will, of course, limit movement of the piston rod downwardly and hence will limit the downward movement of the piston in the metering chamber. The gap between the shortest gauge pin and the longest provides for completely filling the metering chamber and the pins as they increase in length from the shortest, shown at the right side of the piston rod, to the longest at the left side progressively decrease the movement of the metering piston and consequently progressively decreases the amount of plastisol that will be drawn into the metering chamber. The plate 570 is fixed to the upper end of a shaft 571 suitably journaled in a frame 574 bolted or otherwise secured to the lower end of a plate 576 fastened to the pedestal 520 and a motor M6 is mounted on the frame which has on it a sprocket 578 about which one end of a chain 580 is entrained. The opposite end of the chain 580 is entrained about a sprocket (not shown) on the shaft 571 so that rotation of the motor M6 will effect rotation of the plate 570 and the pins mounted thereon. There is a switch plate (not shown) also on the shaft 571 which operates when rotated to close contacts which will stop the motor M6 with a predetermined pin in position beneath the piston rod. A dial on the console provides for making the desired selection. A wide latitude in volume is thus provided since it is possible within the time period allotted to fill the metering chamber twice. Hence twice as many charges are available as there are metering pins.

At this station the nozzles 518 are supported at the forward end of the slide plate 524 on a horizontal part 525 on which there are also mounted air cylinders 584 containing pistons and rods. The lower ends of the rods have racks thereon and these mesh with gears fast to spindles extending rearwardly from the ball valves in the nozzles 518 whereby the ball valves may be rotated either to permit discharge or to check discharge. The air cylinders 584 are double-acting and are supplied with air at their upper ends through conductors 586 by way of solenoid-operated valves 588 and a common conductor 590 which in turn is connected by a metering valve 600 and conductor pipe 602 to a source of air pressure. The nozzles in this instance are not detachably mounted. A switch S10 depressed by the rocker arm 526 when the latter is tilted downwardly to a position directly above the open tops of the molds activates the solenoid valves 588 thereby opening the ball valves in the nozzles 518. The foregoing structure is disclosed in my pending application Ser. No. 614,620, filed Feb. 8, 1967.

As soon as the plastisol is injected the molds are tilted to incline the bottoms from their heel ends upwardly toward their toes, the effect of which is to cause the plastisol to flow into the counter areas at the heel ends and along the shanks forwardly of the heel pockets to form a coating on these areas. The molds are then righted so that the plastisol flows back into the heel pockets. Rocking the molds is provided for my mechanism at this station like that employed at station 18A.

Although there is no dumping of plastisol from the molds a certain amount of drip takes place at the ends of the nozzles 518 and accordingly a tray 606 provided with a filtering screen 608 is supported below the nozzles 618 to collect the drop. A recovery tank 610 is also provided into which the plastisol from the tray 606 is discharged by an inclined spout 612. Although not shown herein, the tank 610 contains a pump similar to that described with reference to FIG. 22 for returning the recovered plastisol together with fresh plastisol to the main reservoir for reuse.

The foregoing description has dealt with reinforcement of the shank, counter and heel areas; however, it is within the scope of the invention, since the molds may be caused to rotate to any desired angle, to reinforce other areas of the boot, for example the sole, foxing area, back seam, and the like. As illustrative, the sole and back seam may be reinforced by filling or partially filling the molds at station 18I as they were at station 18B and then tilting them rearwardly at station 18J to dump the excess plastisol therein and again righting them at station 18K so that the residual plastisol flows back along the back seam into the heel pocket, forming a reinforced back seam and filling the heel pocket as well as providing an extra layer at the bottom. Curing is initiated at station 18K as will appear hereinafter. If desired, reinforcement may be confined exclusively to the heel pocket and a fabric counter may be inserted.

Returning now to the description of the sequence of operations preceding the paragraph above in which an optional procedure is described, at the next station, that is 18I, the molds are again tilted from vertical positions to inclined positions to again redistribute the still liquid plastisol at the bottom over the counter and shank areas to apply a second layer to the previously formed layers whereupon the molds are again righted so that the residual plastisol settles in and forms pools substantially filling the heel pockets. At this station also the rocking means corresponds to that employed at station 18A.

Now the molds with the added layers of plastisol at the shank, counter and heel are moved to station 18K where heat is applied principally to the heel ends to commence curing of the relatively thick layers of plastisol in the heel pockets. As shown in FIG. 20 the molds move into this station in a vertical position and a plurality of gas jets 614 adjustably supported on a stand 616 are positioned so as to direct burning gas against the molds at the heel ends. Slotted bracket parts 165 and 617 connected by bolts 619 provide for adjusting the nozzles. Additionally heat is applied to the upper ends of the molds to initiate curing by heating elements 618 supported on a pair of bars 620 for movement forwardly and rearwardly on the stand 616. A piston and cylinder assembly 622 comprising a cylinder 624 fixed to the stand and a rod 626 connected to a block 628 to which the heating elements are secured provides for moving the heating elements into and out of operative position. The gas flames are turned on and off in consonance with the movement of molds into and out of position for heating.

The final curing of the composite articles within the molds is now effected in the next five stations 18L to 18P, each of which comprises a bath in which the molds are submerged. Each of the baths comprises a rectangular tank 630 (FIG. 5) supported on a stand 632. The walls of the tank are suitably insulated and heating elements 634 are provided for maintaining the baths at a substantially uniform temperature such as to promote curing. Immersion heaters are employed mounted at the top of the tank so that if one element shorts out it can be readily replaced without stopping the machine. When a salt bath is employed heating of the salt bath is continuous and does not result in a serious heat loss or excessive consumption of power due to the fact that the salt solution does not radiate heat to any extent and the insulation minimizes even this. At each of these stations the molds are lowered into the bath, remain there until the rotor is ready to be indexed to the next position whereupon they are withdrawn, moved to the next station and lowered into the next bath. Suitable thermistors (not shown) are provided to control the temperature in the baths.

Following the last of the salt baths the molds are moved to station 18Q and thrust into a tank like that used for the salt baths which contains only fresh water, the purpose of this being to wash the salt deposit on the molds from the exterior surfaces. The salt is recovered by precipitation whenever the apparatus is shut down and may be scooped out of the bottom of the tanks, dried and reused.

At the next station which is 18R and hence the final station in the cycle of operation there is a tank like those used for the curing baths and this tank contains water. Heating elements are mounted on the tank to effect heating if necessary to a temperature such that when the molds reach station 18B they will be at a temperature suitable for filling. The tank is also provided with a heat exchanger for effecting cooling when desired since the bath may actually be heated to a higher temperature than desired by the repeated submersion of the molds from the preceding curing baths. The heat exchanger is of conventional make controlled by a thermostat and sensor, the latter setting a pump in operation so as to circulate fluid through the exchanger and a cooling fan is employed for cooling the fluid down.

If desired and as herein shown in FIG. 6, the interior of the cured article may be sprayed with adhesive and this may be carried out at either station 18Q or station 18R since the molds are upright at both of these stations by lowering a spray head 636 into each mold for spraying the interior. A quick-drying pressure-sensitive adhesive may be employed.

The circuitry employed for maintaining control of the apparatus is not disclosed herein in any detail since it is obvious that there are various programming systems which may be adapted to this apparatus for the purpose of obtaining the sequence of operations described herein.

Advantages of the machine are high production, minimal hand work and supervision, simultaneous manufacture of articles of different kinds and/or material at the same or different times with minor adjustments; manufacture of articles to varying degrees of completion; and economical use of plastisol and power.

It should be understood that the present disclosure is for the purpose of illustration only and that this invention includes all modifications and equivalents which fall within the scope of the appended claims.

I claim:

1. Apparatus for use in the manufacture of hollow articles by slush-molding, said apparatus comprising a rotor, means for effecting repeated intermittent rotation of the rotor, means for effecting movement of the rotor from one level to another, a mold on the rotor, and drive means for effecting the aforesaid movement to carry said mold from one station to the next while at one level and for effecting movement from the one level to the other during the interval between movements from one station to the next, said drive means comprising a motor, a drive shaft, rotation of which effects rotation of the rotor, a driving connection between the motor and the drive shaft which includes a clutch rotatable in one direction to effect movement of the rotor toward the next station in the succession of stations, switch means operable as the rotor approaches said next station but prior to reaching said station to render the motor ineffective so that the rotor slows to a stop, and means for limiting rotation of the clutch following operation of the switch.

2. Apparatus for use in the manufacture of hollow articles by slush-molding, said apparatus comprising a base, a rotor mounted on the base for rotation about a vertical axis and for vertical movement from one level to another, means for effecting intermittent rotation of the rotor about said vertical axis, means for effecting vertical movement of the rotor from one level to another, a mold on the rotor, and driving means for effecting the aforesaid movement, said driving means comprising a motor, a drive shaft journaled on the base, a driving element on the drive shaft, said driving element having driving relation with the rotor, a driving connection between the motor and the drive shaft, said connection including a one-way clutch rotatable by said motor to move the rotor toward the next station of operation, a first switch operably associated with the driving connection to reverse the motor before the rotor reaches the next station of operation thereby rendering the clutch ineffective, a locking element on the base movable into engagement with the rotor to prevent rotation of the rotor relative to the base, and a second switch operable by rotation of the rotor before the rotor reaches the next station of operation to initiate operation of the locking element.

3. Apparatus for use in the manufacture of hollow articles by slush-molding, said apparatus comprising a base, a rotor mounted on the base for rotation about a vertical axis and for vertical movement from one level to another, a mold on the rotor, and means for driving the rotor to move the mold along a predetermined path relative to a plurality of stations located along said path at uniformly spaced intervals, comprising a first motor, a drive shaft connected to the rotor, means connecting the first motor to the drive shaft which includes a clutch rotatable in one direction to effect movement of the rotor toward the next station in the succession of stations, and switch means operable as the rotor approaches said next station but prior to reaching said station to render the motor ineffective, a second motor, a rotatable driving element connected to the second motor and rotatable thereby, means mounted on the base for converting the rotary movement of the rotatable drive element to vertical movement of the rotor, means connecting the second motor to said last means to effect vertical movement of the rotor, a brake on the rotatable driving element, and means operable by the rotor at its upper and lower levels to stop said motor and apply the brake.

4. Apparatus according to claim 3, wherein the brake is electrically operable and the means to stop the motor and apply the brake are upper and lower limit switches.

5. Apparatus for use in the manufacture of hollow articles by slush-molding, said apparatus comprising a plurality of stations arranged along the predetermined path, means at each station for performing a different operation on a mold presented thereto in the process of forming a finished article, a mold support, a mold on said support, said mold support being movable along said path thereby to carry the mold mounted thereon from station to station and movable vertically between stations to permit the mold to be moved into and out of operative relation with a means at each station provided for operating on the mold at that station, and drive means for effecting intermittent lateral movement of the mold support and a mold carried thereby from one station to the next while the support is at the higher level and for effecting movement of the mold support and mold carried thereby from the higher level to the lower level and then back to the higher level during the interval between successive lateral movement, said means for effecting the lateral movement comprising power operable means, a drive shaft rotation of which will effect lateral movement of the mold support, a driving connection between the power operable means and said shaft, said power operable means being intermittently operable to effect movement of the mold support from station to station, a brake associated with the shaft operable to brake the mold support to a stop at each station and yieldable means embodied in the driving connection between the power operable means and the brake.

6. Apparatus according to claim 3, wherein there is yieldable means embodied in the rotatable driving element comprising shafts arranged end-to-end with their ends connected, respectively, to the power-operable means and to the brake, sprockets fixed to the adjacent ends of the shafts with their lateral faces parallel, and a link chain entrained about the two sprockets.

7. Apparatus for use in the manufacture of hollow articles by slush-molding, said apparatus comprising a mold support movable along a predetermined path, molds mounted on said support, said support being movable vertically from one level to another during movement along said path, a plurality of stations situated along said path, and drive means for effecting intermittent lateral movement of the mold support and the molds carried thereby from one station to the next while the support is at the higher level, and for effecting vertical movement of the mold support and molds carried thereby from the higher level to the lower level and then back to the higher level during the interval between successive lateral movements, comprising means for initiating operation of said drive means to move the molds from station to station, means at the several stations operative while the molds are at the lower level to perform at least one operation thereon incident to the manufacture of the article, and means mounting the molds on the support for movement from station to station, comprising arms mounted on the support at intervals corresponding to the distance between stations of operation, said arms extending laterally outward from the support, a bracket rotatably mounted between each pair of arms, means on each bracket operable to clamp a mold thereto, a shaft mounted on one arm of each pair of arms, a driving connection between each shaft and one of the brackets, said shafts and driving connections being movable with the mold support in elevation, a drive shaft mounted on the base at one of the stations of operation, means at the end of each shaft and drive shaft interengageable by movement of the support to said lower level to connect each shaft in turn as it moves to said station to the drive shaft at the station, and means operable when the shaft is at said lower level to effect rotation of the drive shaft a predetermined amount.

8. Apparatus according to claim 7, comprising brake means on each shaft operable to prevent rotation thereof when the latter is disengaged from the drive shaft.

9. Apparatus according to claim 7, wherein said brake means comprises a disk fixed to and rotatable with each shaft, a shoe fixed to the arm adjacent one of the lateral faces of each disk, a block pivotally supported opposite the other lateral face of each disk, means yieldably holding each block pressed against its disk and the disk pressed against its shoe, and an arm connected to each block operable to move the block out of engagement with its disk to enable rotating the bracket.

10. Apparatus according to claim 7, wherein said brake means comprises a disk fixed to and rotatable with each shaft, a shoe supported adjacent one of the lateral faces of each disk, a block pivotally supported at the opposite lateral face of each disc, and means yieldably pressing the block against the disk and the disk against the shoe, said brake preventing gravitational rotation of the bracket while the bracket shaft is disconnected from the drive shaft, and means operable as the mold support moves to the lower level to deactivate the brake.

11. Apparatus according to claim 7, comprising a base on which the mold support is mounted, arms mounted on the mold support at intervals corresponding to the distance between stations of operation, said arms extending laterally toward the stations of operation, a bracket rotatably mounted between each pair of arms, means on each bracket for clamping one or more molds thereto, a drivable shaft on one of the arms of each pair of arms, a drive shaft at the base at certain of the stations of operation, said drivable shaft and drive shaft being interconnectable as the mold support moves to the lower level, and a driving connection between each drive shaft and the bracket with which it is associated, comprising a sprocket secured to the rotatable bracket, a sprocket secured to the drive shaft, and a chain entrained about said sprockets.

12. Apparatus for use in the manufacture of hollow articles by slush-molding, said apparatus comprising a plurality of stations arranged along a predetermined path, means at each station for performing a different operation on a mold presented thereto in the process of forming a finished article, a mold support, a mold on said support, said mold support being movable along said path thereby to carry the mold mounted thereon from station to station and movable vertically between stations to permit the mold to be moved into and out of operative relation, with the means at each station provided for operating on the mold at that station, said means at the successive stations operating in succession to fill the mold with a thermosetting plastic, apply heat to the exterior of the mold to form an initial layer of gelled plastic on the inner surface of the mold, remove the ungelled plastic from the mold and partially cure said initial layer of gelled plastic, said means for applying heat to the exterior of the mold, following filling, comprising at one station a liquid bath into which the mold is thrust bottom down to submerge the mold substantially up to the level of the plastic interiorly thereof, and at the next station a gaseous heating medium into which the mold is thrust so that the gaseous heating medium rises upwardly along the sides of the mold.

13. Apparatus for use in the manufacture of hollow articles by slush-molding, said apparatus comprising a plurality of stations arranged along a predetermined path, means at each station for performing a different operation on a mold presented thereto in the process of forming a finished article, a mold support, a mold on said support, said mold support being movable along said path thereby to carry the mold mounted thereon from station to station and movable vertically between stations to permit the mold to be moved into and out of operative relation, with the means at each station provided for operating on the mold at that station, said means at the successive stations operating in succession to fill the mold with a thermosetting plastic, apply heat to the exterior of the mold to form an initial layer of gelled plastic on the inner surface of the mold, remove the ungelled plastisol from the mold and partially cure said gelled layer, said means for removing ungelled plastisol from the mold comprising at one station means operable to invert the mold, means at the station where the mold is inverted for maintaining the mold inverted as it moves to the next station, and means at said next station for partially curing the layer of gelled plastic left in the inverted mold comprising banks of heating elements supported at said station above the level of the bottom of the inverted mold and at the back side thereof for partially curing the layer of gelled plastic while the mold is held inverted.

14. Apparatus for use in the manufacture of hollow articles by slush-molding, said apparatus comprising a plurality of stations arranged along a predetermined path, means at each station for performing a different operation on a mold presented thereto in the process of forming a finished article, a mold support, a mold on said support, said mold support being movable along said path thereby to carry the mold mounted thereon from station to station and movable vertically between stations to permit the mold to be moved into and out of operative relation, with the means at each station provided for operating on the mold at that station, said means at the successive stations operating in succession to fill the mold with a thermosetting plastic, apply heat to the exterior of the mold to form an initial layer of gelled plastic on the inner surface of the mold, remove the ungelled plastic from the mold and partially cure said gelled layer, said means for applying heat to the exterior of the mold, following fill, comprising a salt bath into which the mold is thrust as the mold support moves to said lower position to submerge the molds substantially up to the level of the plastic interiorly thereof and following withdrawal of the mold from the salt bath immersing it in a hot gaseous medium to evaporate the residual moisture from the surface of the mold prior to movement of the mold to the station for emptying.

15. Apparatus for use in the manufacture of hollow articles by slush-molding, said apparatus comprising a plurality of stations arranged along a predetermined path, means at each station for performing a different operation on a mold presented thereto in the process of forming a finished article, a mold support, a mold on said support, said mold support being movable along said path thereby to carry the mold mounted thereon from station to station and movable vertically between stations to permit the mold to be moved into and out of operative relation, with the means at each station provided for operating on the mold at each station, said means at the successive stations operating in succession to fill the mold with plastic, apply heat to the exterior of the mold to form an initial layer of gelled plastic on the inner surface of the mold, remove the ungelled plastic from the mold and partially cure said gelled layer, means at the station for removing the ungelled plastisol for inverting the mold at that station, said means effecting inversion of the mold by rotation and being operable to rotate the mold from an inverted position to an upright position following emptying of the mold, and means for thereafter introducing a predetermined quantity of added liquid plastic into the mold into the partially cured layer interiorly thereof, and for rocking the mold to incline the bottom upwardly from the heel toward the toe to distribute the added plastic over the shank and counter areas of the bottom.

16. Apparatus for use in the manufacture of hollow articles by slush-molding, said apparatus comprising a plurality of stations arranged along a predetermined path, means at each station for performing a different operation on a mold presented thereto in the process of forming a finished article, a mold support, a mold on said support, said mold support being movable along said path thereby to carry the mold mounted thereon from station to station and movable vertically between stations to permit the mold to be moved into and out of operative relation, with the means at each station provided for operating on the mold at each station, said means at the successive stations operating in succession to fill the mold with a plastic, apply heat to the exterior of the mold to form an initial layer of gelled plastic on the inner surface of the mold, remove the ungelled plastic from the mold and partially cure said gelled layer, said means for effecting gelling and partial curing comprise salt baths and a fresh water bath following the last of the salt baths into which the mold is thrust as the mold support is moved to its lower level to wash the salt from the mold.

17. Apparatus according to claim 16, wherein the mold is upright when it is thrust into the fresh water bath for washing the salt therefrom and there is means at said station movable into the interior of the mold for applying adhesive to the interior of the cured article.

18. Apparatus for use in the manufacture of hollow articles by slush-molding, said apparatus comprising a plurality of stations arranged along a predetermined path, means at each station for performing a different operation on a mold presented thereto in the process of forming a finished article, a mold support, a mold on said support, said mold support being movable along said path thereby to carry the mold mounted thereon from station to station and movable vertically between stations to permit the mold to be moved into and out of operative relation, with the means at each station provided for operating on the mold at each station, said means at the successive stations operating in succession to fill the mold with a thermosetting plastic, apply heat to the exterior of the mold to form an initial layer of gelled plastic on the interior surface of the mold, remove the ungelled plastisol from the mold and partially cure said gelled layer, means at the station for removing ungelled plastisol for inverting the mold, said means being operable thereafter to rotate the mold to an upright position, comprising means for depositing a predetermined quantity of added plastic into the mold following rotation to its upright position, means for rocking the mold from its upright position to an inclined position and back to add a layer to the shank and counter areas, and means at the next station of operation for again rocking the mold from its upright position to an inclined position and back again to add a second layer to the shank and counter areas, and to leave a residue in the heel pocket.

19. Apparatus according to claim 18, comprising means for applying heat to the bottom of the mold following said addition of plastic to commence curing of the liquid plastic contained by the heel pocket.

20. Apparatus according to claim 3, comprising a base and wherein the means for effecting vertical movement of the mold support comprises screws supported at their upper ends and lower ends between the mold support and the base, said screws being connected at their upper ends to the mold support, and shafting drivably connecting the lower end of each screw to said second motor.

21. Apparatus for use in the manufacture of hollow articles by slush-molding, said apparatus comprising a plurality of stations arranged along a predetermined path, means at each station for performing a different operation on the mold presented thereto in the process of forming a finished article, a mold support, a mold on said support, said mold support being movable along said path thereby to carry the mold mounted thereon from station to station and movable vertically between stations to permit the mold to be moved into and out of operative relation, with the means at each station provided for operating on the mold at each station, means at the successive stations operating in succession to fill the mold with a thermosetting plastic, applying heat to the exterior of the mold to form an initial layer of gelled plastic on the interior surface of the mold, remove the ungelled plastic from the mold and partially cure said gelled layer, said means for effecting removal of the ungelled plastic from the mold comprising means for rotating the mold from an upright position to an inverted position to empty the mold and return it to its upright position, said last-named means comprising a rotatable bracket on the mold support, clamping means on the bracket for attaching the mold thereto, drivable means operable to effect rotation of the bracket, said means being movable in elevation with the mold support, drive means at the base of the machine for driving said drivable means, and means on said drivable means and said drive means interengageable by movement of the mold support to said lower level to drivably connect the drivable means to the drive means.

22. Apparatus according to claim 2, comprising a shaft for rotating the bracket, said shaft being mounted on the mold support and being movable in elevation therewith, a drive shaft on the base situated in axial alignment with the shaft on the mold support, and means on the shafts interengageable by movement of the mold support from its upper to its lower level, to connect the shafts to each other so that rotation of the shaft on the base effects a corresponding rotation of the shaft on the mold support.

23. Apparatus according to claim 22, wherein said interengageable means comprises a key diametrical of the end of one shaft and a keyway diametrical of the end of the other shaft, said key being freely slidable into and out of the keyway as the mold support is lowered and raised relative to the base.

24. Apparatus for use in the manufacture of hollow articles by slush-molding, said apparatus comprising a base and rotatable mold support mounted thereon for movement along a predetermined path, molds mounted on the support, said support being movable vertically from one level to another during movement along said path, a plurality of stations situated along said path, and drive means for effecting intermittent lateral movement of the mold support and the molds carried thereby from one station to the next while the support is at the higher level, and for effecting vertical movement of the mold support and molds carried thereby from the higher level to the lower level and then back to the higher level during the interval between successive lateral movements, comprising means for initiating operation of said drive means to move the molds from station to station, means at the several stations operative while the molds are at the lower level to perform at least one operation thereon incident to the manufacture of the article, and means for supporting the molds on the support comprising arms mounted on the support at intervals corresponding to the distance between stations of operation, said arms extending laterally toward the operating stations, a bracket mounted between each pair of arms, means on each bracket operable to clamp a plurality of molds thereto, each bracket being rotatable about a horizontal axis to tilt the bracket and hence the molds at certain of said stations of operation, a shaft mounted on every other arm, a driving connection between each shaft and one of the brackets by means of which the bracket is rotatable, drive shafts mounted on the base at said certain stations of operation, means on the respective shafts interengageable by movement of the support to the lower level to connect the shafts at said stations with the drive shafts at said stations, and means operable to effect rotation of each drive shaft while the support is at said lower level, said means being reversible and being adjustable to enable predetermining the amount of rotation of each drive shaft.

25. Apparatus for use in the manufacture of hollow articles by slush-molding, said apparatus comprising a plurality of stations arranged along a predetermined path, means at each station for performing a different operation on a mold presented thereto in the process of forming a finished article, a base, a mold support mounted on said base, said mold support comprising a rigid structure rotatable about a predetermined center and wherein the stations of operation are located circularly about the structure, arms fixed to the structure extending radially from said center of rotation, the distance between adjacent arms at their distal ends corresponding substantially to the distance between stations of operation, bracket members pivotally mounted between the adjacent arms at their distal ends, clamps on the bracket members for clamping a plurality of molds to each bracket for movement of the molds circularly with respect to said axis of rotation and for rotational movement about horizontal axes, said mold support being movable along said path of rotation thereby to carry the molds mounted thereon from station to station and movable vertically between stations to permit the molds to be moved into and out of operative relation with the means at each station provided for operating on the molds at that station, a drive shaft at each of several stations of operations, means at the proximal ends of one arm of each pair of arms drivably engageable with one of said drive shafts by movement of the mold support to said lower level, means connecting each rotatable bracket with said means at the proximal end of one of the arms of the pair of arms with which it is associated, drive means for effecting repeated intermittent rotational movement of the mold support and molds carried thereby from one station to the next while the support is at the higher level and for effecting movement of the mold support and molds carried thereby from the higher level to the lower level and then back to the higher level during the interval between successive rotational movements, and means for initiating continuous operation of said drive means.

26. Apparatus according to claim 25, comprising means supporting the bracket for rotation about horizontal axes which are tangent to a circle having at its center said axis of rotation, comprising a bearing hole at the distal end of one arm of each pair, the axis of which is at right angles to the radial axis of said arm, and a bearing block secured to the distal end of the adjacent arm containing a bearing hole, the axis of which is aligned with that in the one arm.

27. Apparatus according to claim 25, comprising means for supporting the brackets for rotation about horizontal axes which are tangent to a circle having at its center said axis of rotation, comprising at the distal end of each arm a bearing hole and a bearing block containing a bearing hole, the axes of said bearing holes intersecting at an angle which is complementary to the angle between the arms.

* * * * *